United States Patent
Kawamoto et al.

(10) Patent No.: US 11,195,351 B2
(45) Date of Patent: Dec. 7, 2021

(54) WORK MACHINE MEASUREMENT SYSTEM, WORK MACHINE, AND MEASURING METHOD FOR WORK MACHINE

(71) Applicant: Komatsu Ltd., Tokyo (JP)

(72) Inventors: Shun Kawamoto, Tokyo (JP); Toyohisa Matsuda, Tokyo (JP); Hiroyoshi Yamaguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 150 days.

(21) Appl. No.: 16/487,863

(22) PCT Filed: Jul. 27, 2018

(86) PCT No.: PCT/JP2018/028347
§ 371 (c)(1),
(2) Date: Aug. 22, 2019

(87) PCT Pub. No.: WO2019/044316
PCT Pub. Date: Mar. 7, 2019

(65) Prior Publication Data
US 2020/0058177 A1 Feb. 20, 2020

(30) Foreign Application Priority Data
Sep. 1, 2017 (JP) .............................. JP2017-168955

(51) Int. Cl.
*G07C 5/08* (2006.01)
*E02F 3/43* (2006.01)
(Continued)

(52) U.S. Cl.
CPC .............. *G07C 5/0825* (2013.01); *E02F 3/43* (2013.01); *E02F 3/651* (2013.01); *E02F 9/261* (2013.01); *E02F 9/264* (2013.01); *G01C 7/02* (2013.01)

(58) Field of Classification Search
CPC ... E02F 3/43; E02F 3/651; E02F 9/123; E02F 9/2221; E02F 9/261; E02F 9/264;
(Continued)

(56) References Cited

U.S. PATENT DOCUMENTS 7,615,960 B2    11/2009   Morinaga et al.
9,340,953 B2    5/2016   Sakamoto et al.
(Continued)

FOREIGN PATENT DOCUMENTS

CN        1950574 A       4/2007
CN     104395537 A       3/2015
(Continued)

OTHER PUBLICATIONS

International Search Report dated Oct. 30, 2018, issued for PCT/JP2018/028347.
(Continued)

*Primary Examiner* — Tyler J Lee
(74) *Attorney, Agent, or Firm* — Locke Lord LLP

(57) ABSTRACT

A work machine measurement system includes an image acquisition unit that acquires an image of a work target captured, while a swinging body of a work machine is swinging, by an image capturing device mounted on the swinging body, a three-dimensional position calculation unit that calculates a three-dimensional position of the work target based on the image, a swing data acquisition unit that acquires swing data about the swinging body, a determination unit that determines whether or not the swing data satisfies a predefined swinging condition and an output unit that outputs a swinging instruction signal based on a result of the determination by the determination unit.

9 Claims, 12 Drawing Sheets

(51) Int. Cl.
*E02F 3/65* (2006.01)
*E02F 9/26* (2006.01)
*G01C 7/02* (2006.01)

(58) Field of Classification Search
CPC ......... E02F 9/267; G01B 11/00; G01C 15/00; G01C 7/02; G07C 5/0825; G07C 5/0841
See application file for complete search history.

(56) References Cited

U.S. PATENT DOCUMENTS

| | | | |
|---|---|---|---|
| 10,233,615 B2 | 3/2019 | Yamaguchi et al. | |
| 10,385,542 B2 | 8/2019 | Shike et al. | |
| 10,385,543 B2 | 8/2019 | Shike et al. | |
| 10,750,082 B2 | 8/2020 | Takahashi et al. | |
| 2007/0229007 A1 | 10/2007 | Morinaga | |
| 2009/0293322 A1* | 12/2009 | Faivre | G05D 1/0891 37/348 |
| 2012/0212588 A1 | 8/2012 | Ohtomo et al. | |
| 2013/0222573 A1 | 8/2013 | Onuma et al. | |
| 2015/0009329 A1 | 1/2015 | Ishimoto | |
| 2015/0337521 A1 | 11/2015 | Sakamoto et al. | |
| 2016/0237654 A1* | 8/2016 | Arimatsu | E02F 9/26 |
| 2016/0251834 A1* | 9/2016 | Arimatsu | E02F 9/26 414/687 |
| 2016/0348343 A1 | 12/2016 | Kanemitsu et al. | |
| 2017/0016211 A1* | 1/2017 | Arimatsu | E02F 9/264 |
| 2017/0107698 A1 | 4/2017 | Yamaguchi et al. | |
| 2017/0280048 A1 | 9/2017 | Takahashi et al. | |
| 2017/0284071 A1 | 10/2017 | Yamaguchi et al. | |
| 2018/0182120 A1 | 6/2018 | Izumikawa | |
| 2018/0245311 A1 | 8/2018 | Shike et al. | |
| 2019/0003153 A1 | 1/2019 | Shike et al. | |

FOREIGN PATENT DOCUMENTS

| | | |
|---|---|---|
| CN | 105518228 A | 4/2016 |
| CN | 106029994 A | 10/2016 |
| CN | 106988357 A | 7/2017 |
| CN | 106988358 A | 7/2017 |
| DE | 112016000052 Tf5 | 3/2017 |
| JP | 2002-310652 A | 10/2002 |
| JP | 2007-147588 A | 6/2007 |
| JP | 2008-53766 A | 3/2008 |
| JP | 2012-173114 A | 9/2012 |
| JP | 2017-71915 A | 4/2017 |
| WO | 2015/167022 A1 | 11/2015 |
| WO | 2017/033991 A1 | 3/2017 |

OTHER PUBLICATIONS

Deutsches Patent Office Action dated Oct. 5, 2021 for corresponding DE Patent Application No. 12018000828.2, 5 pages.

* cited by examiner

FIG.13

(A) DO NOT PERFORM OPERATION FOR RE-SWINGING AFTER SWINGING HAS STOPPED — 33A (B) SLOW DOWN SWING SPEED — 33A (C) REDUCE SWING ANGLE — 33A (D) SWINGING MUST BE IN SINGLE DIRECTION DURING SWINGING SEQUENTIAL IMAGE CAPTURING — 33A (E) CHANGE POSITION OF VEHICLE BODY

CHECK ORIENTATION OF WORKING EQUIPMENT — 33A

WORK MACHINE MEASUREMENT SYSTEM, WORK MACHINE, AND MEASURING METHOD FOR WORK MACHINE

FIELD

The present invention relates to a work machine measurement system, a work machine, and a measurement method for a work machine.

BACKGROUND

In the technical field relating to a work machine, a work machine provided with an image capturing device, as disclosed in Patent Literature 1, is known. Stereo processing is executed on a pair of images captured by a pair of image capturing devices, so that the three-dimensional shape of a target around the work machine is measured.

CITATION LIST

Patent Literature

Patent Literature 1: WO 2017/033991 A

SUMMARY

Technical Problem

When the image capturing devices sequentially capture images of a target around the work machine while a swinging body is swinging, the swinging body might swing under swinging conditions degrading the measurement accuracy of the stereo measurement. As a result, the measurement accuracy of the three-dimensional shape of the object might be degraded.

An aspect of the present invention seeks to suppress degradation of the measurement accuracy of a three-dimensional shape of an object.

Solution to Problem

According to an aspect of the present invention, a work machine measurement system comprises: an image acquisition unit that acquires an image of a work target captured, while a swinging body of a work machine is swinging, by an image capturing device mounted on the swinging body; a three-dimensional position calculation unit that calculates a three-dimensional position of the work target based on the image; a swing data acquisition unit that acquires swing data about the swinging body; a determination unit that determines whether or not the swing data satisfies a predefined swinging condition; and an output unit that outputs a swinging instruction signal based on a result of the determination by the determination unit.

Advantageous Effects of Invention

An aspect of the present invention can suppress the degradation of the measurement accuracy of the three-dimensional shape of a target.

BRIEF DESCRIPTION OF DRAWINGS

FIG. 13 is a diagram illustrating an example of what is displayed on a display device according to the present embodiment.

DESCRIPTION OF EMBODIMENTS

Figure 1:
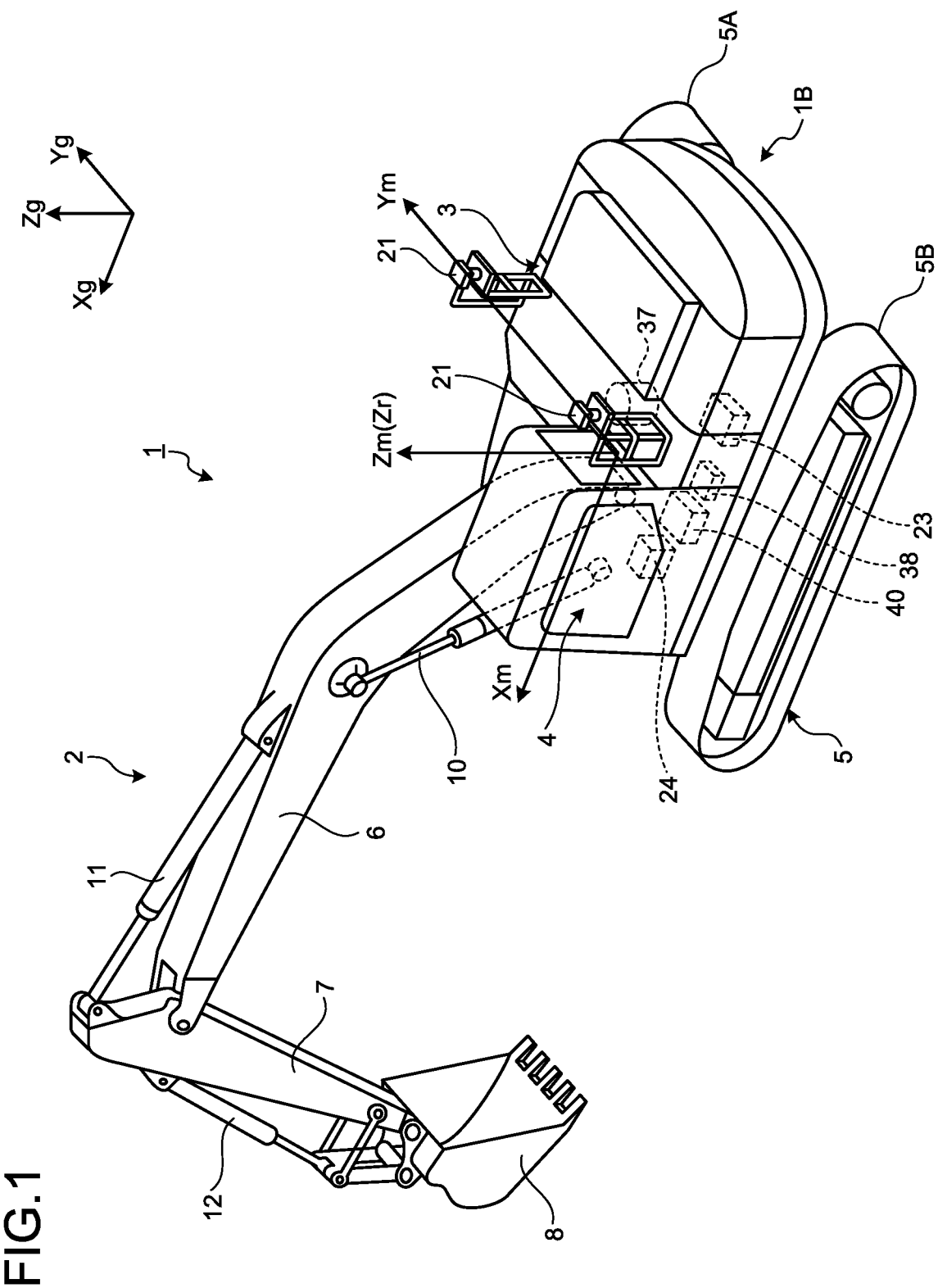
FIG. 1 is a perspective view illustrating an example of a work machine according to the present embodiment.

Hereinafter, embodiments of the present invention will be described with reference to the drawings, without limiting the present invention thereto. The components of the embodiments described below can be combined as appropriate. In addition, some components may not be used.

In the following description, the positional relationship among components are described based on the definitions of a three-dimensional on-site coordinate system (Xg, Yg, Zg), a three-dimensional vehicle body coordinate system (Xm, Ym, Zm), and a three-dimensional image capturing device coordinate system (Xs, Ys, Zs).

The on-site coordinate system is a coordinate system based on an origin fixed to the earth. The on-site coordinate system is a coordinate system defined by the global navigation satellite system (GNSS). The GNSS is short for the global navigation satellite system. One example of the global navigation satellite system is the global positioning system (GPS).

The on-site coordinate system is defined by an Xg axis that is on the horizontal plane, a Yg axis that is on the horizontal plane and is orthogonal to the Xg axis, and a Zg axis that is orthogonal to the Xg axis and the Yg axis. A direction of rotation or inclination about the Xg axis is referred to as a θXg direction, a direction of rotation or inclination about the Yg axis is referred to as a θYg direction, and a direction of rotation or inclination about the Zg axis is referred to as a θZg direction. The Zg axis direction is the vertical direction.

The vehicle body coordinate system is defined by an Xm axis that is on a first predetermined plane based on an origin defined for a vehicle body of a work machine, a Ym axis that is on the first predetermined plane and is orthogonal to the Xm axis, and a Zm axis that is orthogonal to the Xm axis and the Ym axis. A direction of rotation or inclination about the Xm axis is referred to as a θXm direction, a direction of rotation or inclination about the Ym axis is referred to as a θYm direction, and a direction of rotation or inclination about the Zm axis is referred to as a θZm direction. The Xm-axis direction is a forward and backward direction of the work machine, the Ym-axis direction is a vehicle width direction of the work machine, and the Zm-axis direction is an upward and downward direction of the work machine.

The image capturing device coordinate system is defined by an Xs axis that is on a second predetermined plane based on an origin defined for the image capturing device, a Ys axis that is on the second predetermined plane and is orthogonal to the Xs axis, and a Zs axis that is orthogonal to the Xs axis and the Ys axis. A direction of rotation or inclination about the Xs axis is referred to as a θXs direction, a direction of rotation or inclination about the Ys axis is referred to as a θYs direction, and a direction of rotation or inclination about the Zs axis is referred to as a θZs direction. The Xs axis direction is an upward and downward direction of the image capturing device, the Ys axis direction is a width direction of the image capturing device, and the Zs axis direction is a forward and backward direction of the image capturing device. The Zs axis direction is parallel to the optical axis of the optical system of the image capturing device.

The position in the on-site coordinate system, the position in the vehicle body coordinate system, and the position in the image capturing device coordinate system can be converted from one to another.

[Work Machine]

FIG. 1 is a perspective view illustrating an example of a work machine 1 according to the present embodiment. In the present embodiment, an example in which the work machine 1 is an excavator will be described. In the following description, the work machine 1 is referred to as an excavator 1 as appropriate.

As illustrated in FIG. 1, the excavator 1 has a vehicle body 1B and working equipment 2. The vehicle body 1B includes a swinging body 3 and a traveling body 5 that supports the swinging body 3 in a swingable manner.

The swinging body 3 has a cab 4. A hydraulic pump and an internal combustion engine are provided in the swinging body 3. The swinging body 3 is swingable about a swing axis Zr. The swing axis Zr is parallel to the Zm axis of the vehicle body coordinate system. The origin of the vehicle body coordinate system is defined, for example, at the center of the swing circle of the swinging body 3. The center of the swing circle is on the swing axis Zr of the swinging body 3.

The traveling body 5 has crawler belts 5A and 5B. The excavator 1 travels by rotation of the crawler belts 5A and 5B. The Zm axis of the vehicle body coordinate system is orthogonal to ground contact surfaces of the crawler belts 5A and 5B. An upward side (+Zm direction) of the vehicle body coordinate system is a direction away from the ground contact surfaces of the crawler belts 5A and 5B, and a downward side (−Zm direction) of the vehicle body coordinate system is a direction opposite to the upper side of the vehicle body coordinate system.

The working equipment 2 is coupled to the swinging body 3. In the vehicle body coordinate system, the working equipment 2 is at least partially disposed more on the forward side than the swinging body 3. A forward side (+Xm direction) of the vehicle body coordinate system is the direction in which the working equipment 2 is located relative to the swinging body 3, and a backward side (−Xm direction) of the vehicle body coordinate system is the direction opposite to the forward side of the vehicle body coordinate system.

The working equipment 2 drives a boom 6 coupled to the swinging body 3, an arm 7 coupled to the boom 6, a bucket 8 coupled to the arm 7, a boom cylinder 10 that drives the boom 6, an arm cylinder 11 that drives the arm 7, and a bucket cylinder 12 that drives the bucket 8. The boom cylinder 10, the arm cylinder 11, and the bucket cylinder 12 are each a hydraulic cylinder driven by hydraulic pressure.

Further, the excavator 1 has a position detection device 23 that detects the position of the swinging body 3, an orientation detection device 24 that detects the orientation of the swinging body 3, and a control device 40.

The position detection device 23 detects the position of the swinging body 3 in the on-site coordinate system. The position of the swinging body 3 includes coordinates in the Xg axis direction, coordinates in the Yg axis direction, and coordinates in the Zg axis direction. The position detection device 23 includes a GPS receiver. The position detection device 23 is provided in the swinging body 3.

A GPS antenna 21 is provided on the swinging body 3. For example, two GPS antennas 21 are arranged in the Ym axis direction of the vehicle body coordinate system. The GPS antenna 21 receives a radio wave from a GPS satellite, and outputs a signal, generated based on the received radio wave, to the position detection device 23. The position detection device 23 detects the position of the GPS antenna 21 in the on-site coordinate system based on the signal from the GPS antenna 21.

The position detection device 23 executes arithmetic processing based on at least one of the positions of the two GPS antennas 21 to calculate the position of the swinging body 3. The position of the swinging body 3 may be the position of one GPS antenna 21 or a position between the position of one GPS antenna 21 and the position of the other GPS antenna 21.

The orientation detection device 24 detects the orientation of the swinging body 3 in the on-site coordinate system. The orientation of the swinging body 3 includes a roll angle indicating the inclination angle of the swinging body 3 in the rotational direction about the Xm axis, a pitch angle indicating the inclination angle of the swinging body 3 in the rotational direction about the Ym axis, and an azimuth angle indicating an inclination angle of the swinging body 3 in the rotation direction about the Zm axis. The orientation detection device 24 includes an inertial measurement unit (IMU). The orientation detection device 24 is provided in the swinging body 3. A gyro sensor may be installed in the swinging body 3 as the orientation detection device 24.

The orientation detection device 24 detects an acceleration and an angular velocity that act on the orientation detection device 24. By detecting the acceleration and angular velocity acting on the orientation detection device 24, the acceleration and angular velocity acting on the swinging body 3 are detected. The orientation detection device 24 executes arithmetic processing based on the acceleration and angular velocity acting on the swinging body 3 to calculate the orientation of the swinging body 3 including the roll angle, the pitch angle, and the azimuth angle.

The azimuth angle may be calculated based on the detection data about the position detection device 23. The position detection device 23 can calculate the azimuth angle of the swinging body 3 with respect to a reference azimuth in the on-site coordinate system, based on the position of one GPS antenna 21 and the position of the other GPS antenna 21. The reference azimuth is north for example. The position detection device 23 calculates a straight line connecting the position of one GPS antenna 21 and the position of the other GPS antenna 21, and the azimuth angle of the swinging body 3 relative to the reference azimuth can be calculated based on an angle between the calculated straight line and the reference azimuth.

The excavator 1 has a swing motor 37 that generates power for causing the swinging body 3 to swing and a hydraulic controller 38 that controls a swing operation of the swing motor 37. The hydraulic controller 38 controls the flow rate of hydraulic oil supplied to the swing motor 37 by controlling a control valve (not illustrated) based on an amount of operation on an operation device 35 described later.

Figure 2:
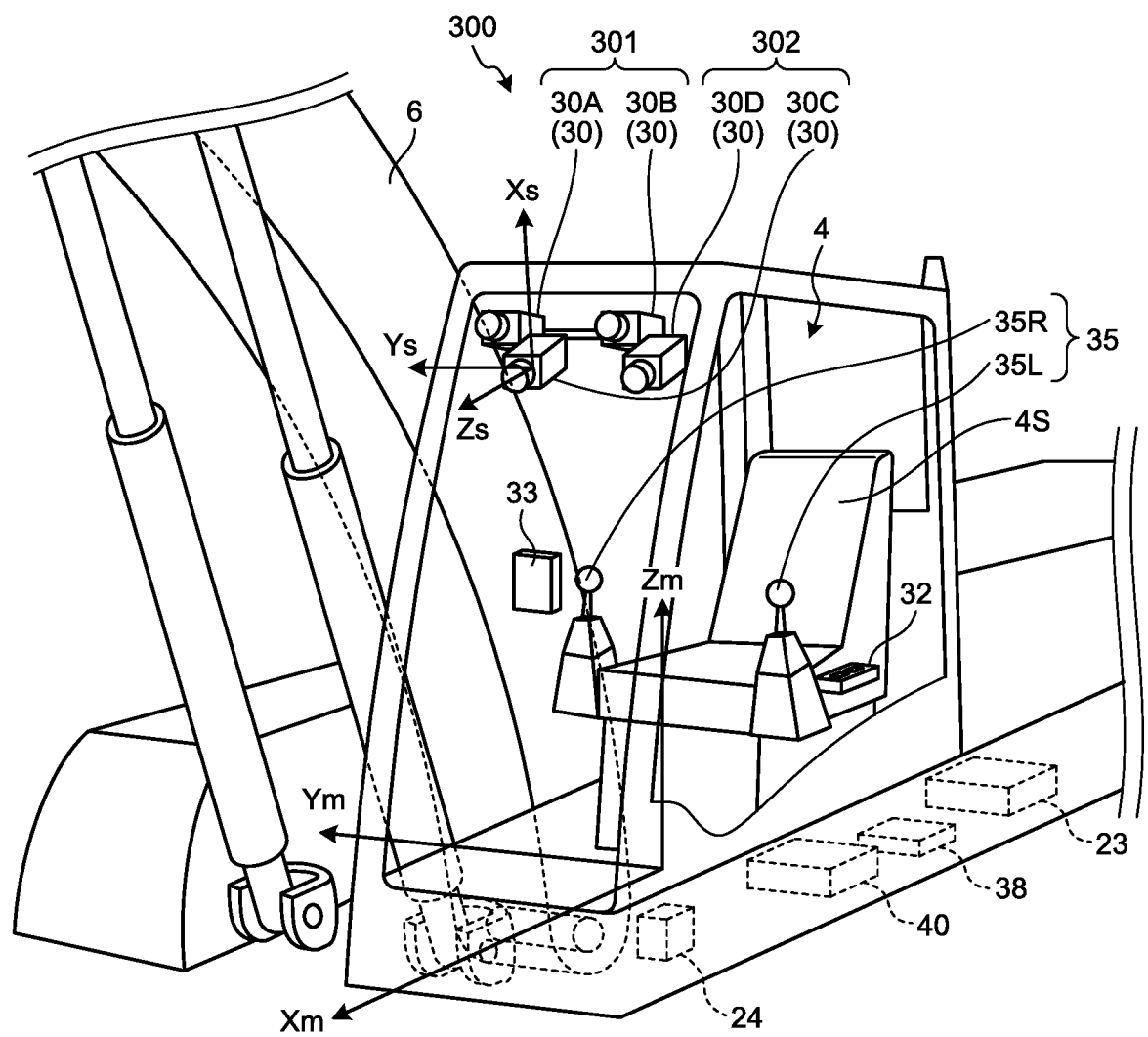
FIG. 2 is a perspective view illustrating a part of the work machine according to the present embodiment.

Next, a stereo camera 300 according to the present embodiment will be described. FIG. 2 is a perspective view illustrating a part of the excavator 1 according to the present embodiment. As illustrated in FIG. 2, the excavator 1 includes the stereo camera 300. The stereo camera 300 is a camera that simultaneously captures images of a work target SB from a plurality of directions to generate parallax data, so that the distance to the work target SB can be measured.

The stereo camera 300 captures images of the work target SB around the excavator 1. The work target SB includes an excavating target to be excavated by the working equipment 2 of the excavator 1. The work target SB may be a work target of a construction operation performed by a work machine different from the excavator 1, or may be a work target of a construction operation performed by a worker. The work target SB is a concept including a work target before the construction operation, a work target under the construction operation, and a work target after construction operation.

The stereo camera 300 is mounted on the swinging body 3. The stereo camera 300 is provided on the cab 4. The stereo camera 300 is disposed on the forward side (+Xm direction) and the upward side (+Zm direction) of the cab 4. The stereo camera 300 captures images of the work target SB in front of the excavator 1.

The stereo camera 300 includes a plurality of image capturing devices 30. The image capturing devices 30 are mounted on the swinging body 3. The image capturing device 30 includes an optical system and an image sensor. The image sensor includes a couple charged device (CCD) image sensor or a complementary metal oxide semiconductor (CMOS) image sensor. In the present embodiment, the image capturing devices 30 include four image capturing devices 30A, 30B, 30C, and 30D.

The stereo camera 300 includes one pair of the image capturing devices 30. The stereo camera 300 includes a first stereo camera 301 including a pair of image capturing devices 30A and 30B, and a second stereo camera 302 including a pair of image capturing devices 30C and 30D.

The image capturing devices 30A and 30C are disposed more on the +Ym side (the working equipment 2 side) than the image capturing devices 30B and 30D. The image capturing device 30A and the image capturing device 30B are arranged while being separated from each other in the Ym axis direction. The image capturing device 30C and the image capturing device 30D are arranged while being separated from each other in the Ym axis direction. The image capturing devices 30A and 30B are disposed more on the +Zm side than the image capturing devices 30C and 30D. In the Zm axis direction, the image capturing device 30A and the image capturing device 30B are disposed at substantially the same position. In the Zm axis direction, the image capturing device 30C and the image capturing device 30D are disposed at substantially the same position.

The image capturing devices 30A and 30B are oriented toward the upward side (+Zm direction). The image capturing devices 30C and 30D are oriented toward the downward side (−Zm direction). The image capturing devices 30A and 30C are oriented toward the forward side (+Xm direction). The image capturing devices 30B and 30D are slightly oriented toward the +Ym side (working equipment 2 side) from the forward side. Thus, the image capturing devices 30A and 30C are oriented toward the forward side of the swinging body 3, and the image capturing devices 30B and 30D are oriented toward the side of the image capturing devices 30A and 30C. The image capturing devices 30B and 30D may be oriented toward the forward side of the swinging body 3, and the image capturing devices 30A and 30C may be oriented toward the image capturing devices 30B and 30D.

The image capturing devices 30 capture images of the work target SB located in front of the swinging body 3. The control device 40 executes the stereo image processing on a pair of images captured by a pair of image capturing devices 30, so that three-dimensional data indicating the three-dimensional shape of the work target SB is calculated. The control device 40 converts three-dimensional data about the work target SB in the image capturing device coordinate system into three-dimensional data about the work target SB in the on-site coordinate system. The three-dimensional data indicates the three-dimensional position of the work target SB. The three-dimensional position of the work target SB includes three-dimensional coordinates of each of a plurality of portions of a surface of the work target SB.

The image capturing device coordinate system is defined for each of the plurality of image capturing devices 30. The image capturing device coordinate system is a coordinate system based on the fixed origin of the image capturing device 30. The Zs axis of the image capturing device coordinate system matches the optical axis of the optical system of the image capturing device 30.

Two sets of stereo cameras (the first stereo camera 301 and the second stereo camera 302) are mounted on the swinging body 3 in the present embodiment. Alternatively, one set of stereo camera may be mounted, or three or more sets of stereo cameras may be mounted.

Furthermore, as illustrated in FIG. 2, the excavator 1 includes a driver's seat 4S, an input device 32, a notification device 33, and the operation device 35. The driver's seat 4S, the input device 32, the notification device 33, and the operation device 35 are disposed in the cab 4. The driver of the excavator 1 sits on the driver's seat 4S.

The driver operates the input device 32 to start or end the image capturing by the image capturing device 30. The input device 32 is provided near the driver's seat 4S. The image capturing device 30 starts or ends the image capturing in response to an operation on the input device 32.

The notification device 33 acquires a notification signal related to swinging from a notification control unit 419 described later, and issues a notification to the driver. Examples of the notification includes an output indicating that a result of the measurement by the stereo camera 300 has succeeded or failed (success/fail), a reason for the failure when the stereo measurement result indicates failure, and guidance on an operation condition of the operation device 35 for operating an excavator 100. Details of the content of the notification will be described later. The notification device 33 is provided near the driver's seat 4S.

The driver operates the operation device 35 to drive or stop the driving of the working equipment 2, to cause the swinging body 3 to swing or stop swinging, and to cause the traveling body 5 to travel or stop travelling. The operation device 35 includes a right control lever 35R and a left control lever 35L for operating the working equipment 2 and the swinging body 3. The operation device 35 further includes a right travel lever and a left travel lever (not illustrated) for operating the traveling body 5. The working equipment 2 is driven or stops, the swinging body 3 swings or stop swinging, and the traveling body 5 travels or stops traveling in response to an operation on the operation device 35.

[Measurement System]

Figure 3:
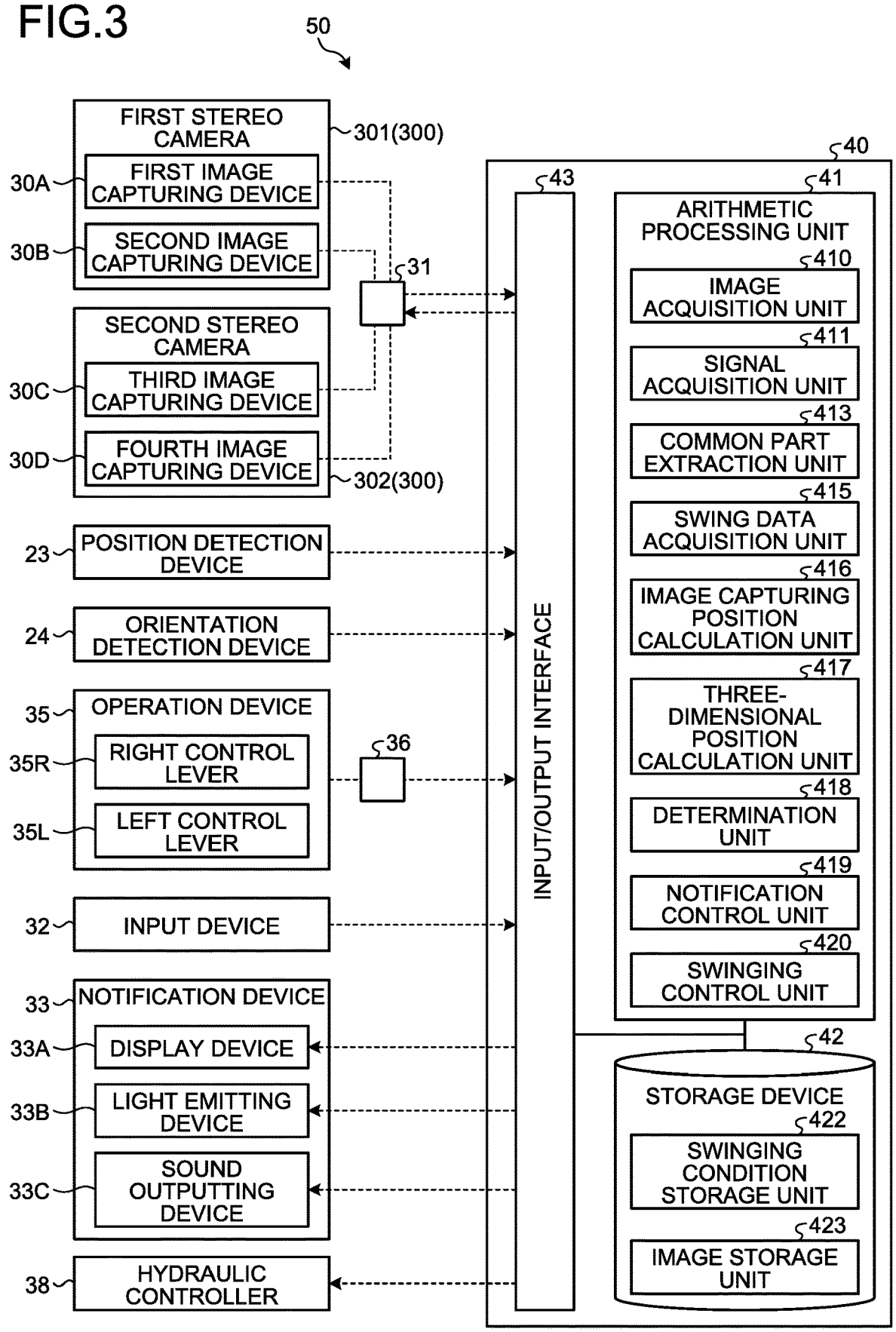
FIG. 3 is a functional block diagram illustrating an example of a measurement system according to the present embodiment.

Next, a measurement system 50 according to the present embodiment will be described. FIG. 3 is a functional block diagram illustrating an example of the measurement system 50 according to the present embodiment. The measurement system 50 is installed in the excavator 1.

The measurement system 50 includes the control device 40, the stereo camera 300 including the first stereo camera 301 and the second stereo camera 302, the position detection device 23, the orientation detection device 24, an operation amount sensor 36 that detects an amount of operation on the operation device 35, the input device 32, and the notification device 33.

The control device 40 is installed in the swinging body 3 of the excavator 1. The control device 40 includes a computer system. The control device 40 includes an arithmetic processing device 41 including a processor such as a central processing unit (CPU), a storage device 42 including a volatile memory such as a random access memory (RAM) and a non-volatile memory such as a read only memory (ROM), and an input/output interface 43.

The arithmetic processing device 41 includes an image acquisition unit 410, a signal acquisition unit 411, a common part extraction unit 413, a swing data acquisition unit 415, an image capturing position calculation unit 416, a three-dimensional position calculation unit 417, a determination unit 418, the notification control unit 419, and a swinging control unit 420.

The image acquisition unit 410 acquires a plurality of images PC of the work target SB, captured by the image capturing devices 30 while the excavator 1 is swinging. The image acquisition unit 410 further acquires the images PC of the work target SB captured by the image capturing devices 30 in an operation stop state of the excavator 1, that is, in a state in which both traveling and swinging are stopped.

The signal acquisition unit 411 acquires an instruction signal generated in response to an operation on the input device 32. The input device 32 is operated to start or end the image capturing by the image capturing devices 30. The instruction signal includes an image capturing start instruction signal and an image capturing end instruction signal. The arithmetic processing device 41 outputs a control signal for causing the image capturing device 30 to start the image capturing, based on the image capturing start instruction signal acquired by the signal acquisition unit 411. Furthermore, the arithmetic processing device 41 outputs a control signal for causing the image capturing device 30 to end the image capturing, based on the image capturing end instruction signal acquired by the signal acquisition unit 411.

Note that the storage device 42 stores the images PC captured in a period between respective time points at which the image capturing start instruction signal and the image capturing end instruction signal are acquired by the signal acquisition unit 411, and these images PC stored in the storage device 42 may be used for the stereo processing.

The common part extraction unit 413 extracts a common part KS in the plurality of images PC captured by the image capturing device 30 while the excavator 1 is swinging. The common part KS will be described later.

The swing data acquisition unit 415 acquires swing data about the swinging body 3 during the swinging. The swing data is data indicating the swinging state of the swinging body 3 and includes at least one of a swing speed V, a swing angle θ, and a swing direction RD of the swinging body 3. As described later, in the present embodiment, the swing data is calculated by the image capturing position calculation unit 416. The swing data acquisition unit 415 acquires the swing data from the image capturing position calculation unit 416.

The image capturing position calculation unit 416 calculates a position P and an orientation of the image capturing device 30 in a state of capturing images. When the swinging body 3 is swinging, the position P of the image capturing device 30 at the time of the image capturing includes the position of the image capturing device 30 in the swing direction RD. When the traveling body 5 is in the traveling state, the position P of the image capturing device 30 at the time of image capturing includes the position of the image capturing device 30 in a traveling direction MD. Furthermore, the image capturing position calculation unit 416 calculates the swing data about the swinging body 3. The swing data about the swinging body 3 includes at least one of the swing speed V, the swing angle θ, and the swing direction RD of the swinging body 3.

The three-dimensional position calculation unit 417 executes stereo processing on a pair of images PC captured by the pair of image capturing devices 30, to calculate the three-dimensional position of the work target SB in the image capturing device coordinate system. The three-dimensional position calculation unit 417 converts the three-dimensional position of the work target SB in the image capturing device coordinate system into a three-dimensional position of the work target SB in the on-site coordinate system, based on the position P of the image capturing device 30 calculated by the image capturing position calculation unit 416.

The determination unit 418 determines whether or not the swing data about the swinging body 3 satisfies a predefined swinging condition. The swinging condition includes conditions for suppressing degradation of the measurement accuracy of stereo measurement. If the swinging condition is not satisfied, the measurement accuracy of the stereo measurement is likely to be degraded. The swinging condition is stored in a swinging condition storage unit 422 of the storage device 42. The swinging condition will be described later.

The notification control unit 419 controls the notification device 33 based on the determination result obtained by the determination unit 418. The notification control unit 419 outputs a notification signal related to swinging to the notification device 33. The notification control unit 419 outputs, for example, at least one of stereo measurement success/failure data, stereo measurement failure reason data, and guidance data as the notification signal related to swinging. The notification control unit 419 functions as an output unit that outputs a notification signal, which is one type of a swinging instruction signal, based on the determination result obtained by the determination unit 418. For example, when the determination unit 418 determines that the swing data does not satisfy a swinging condition, the notification control unit 419 causes the notification device 33 to operate under a first notification mode. When the determination unit 418 determines that the swing data satisfies the swinging condition, the notification control unit 419 may cause the notification device 33 to operate under a second notification mode different from the first notification mode, or may not cause the notification device 33 to operate.

The swinging control unit 420 controls the hydraulic controller 38 that causes the swinging body 3 to swing, based on the determination result obtained by the determination unit 418. The swinging body control unit 420 outputs a control signal for controlling the swinging operation of the swinging body 3 to the hydraulic controller 38. The swinging control unit 420 outputs a control signal to the hydraulic controller 38 that controls the swing motor 37 to control the swing speed of the swinging body 3 during the swinging. The hydraulic controller 38 implements intervening control to reduce the swing speed based on the control signal from the swinging control unit 420. The intervening control is an act of intervening with the swing motor 37 driven based on the amount of operation on the operation device 35 by the driver, to control the swing motor 37 based on the control signal output from the swinging control unit 420. The swinging control unit 420 functions as an output unit that outputs a control signal, which is one type of swinging instruction signal, based on the determination result obtained by the determination unit 418. In the present embodiment, the swinging control unit 420 limits the swinging operation by the swinging body 3 to slowdown the swing speed.

The storage device 42 includes the swinging condition storage unit 422 and an image storage unit 423.

The swinging condition storage unit 422 stores swinging conditions based on which the notification device 33 operates. The image storage unit 423 sequentially stores the plurality of images PC captured by the image capturing devices 30.

The input/output interface 43 includes an interface circuit that connects the arithmetic processing device 41 and the storage device 42 to an external device. A hub 31, the position detection device 23, the orientation detection device 24, the operation amount sensor 36, the input device 32, and the notification device 33 are connected to the input/output interface 43.

The plurality of image capturing devices 30 (30A, 30B, 30C, and 30D) are connected to the arithmetic processing device 41 via the hub 31. The image capturing device 30 captures the image PC of the work target SB, based on the image capturing start instruction signal from the signal acquisition unit 411. The image PC of the work target SB captured by the image capturing device 30 is input to the arithmetic processing device 41 and the storage device 42 via the hub 31 and the input/output interface 43. Each of the image acquisition unit 410 and the image storage unit 423 acquires the image PC of the work target SB captured by the image capturing device 30 via the hub 31 and the input/output interface 43. The hub 31 may be omitted.

The input device 32 is operated to start or end the image capturing by the image capturing devices 30. The image capturing start instruction signal or the image capturing end instruction signal is generated in response to an operation on the input device 32. An example of the input device 32 is at least one of an operation switch, an operation button, a touch panel, a voice input, and a keyboard.

The notification device 33 includes a display device 33A, a light emitting device 33B, and a sound outputting device 33C. The display device 33A includes a flat panel display such as a liquid crystal display (LCD) or an organic electroluminescence display (OELD). The light emitting device 33B includes a light source such as a light emitting diode (LED). The sound outputting device 33C includes a siren or an audio output device capable of generating a warning sound. The notification device 33 notifies the driver of information, by using at least one of display data displayed on the display device 33A, light emitted from the light emitting device 33B, and sound output from the sound outputting device 33C.

In the present embodiment, the notification device 33 issues a notification indicating that the swing data does not satisfy the swinging condition, to the driver. The display device 33A displays display data including texts or an image as the notification indicating that the swing data does not satisfy the swinging condition. The light emitting device 33B emits light as the notification indicating that the swing data does not satisfy the swinging condition. The sound outputting device 33C outputs the warning sound or a voice as the notification indicating that the swing data does not satisfy the swinging condition. The notification device 33 may issue a notification indicating that the swing data satisfies the swinging condition.

The notification device 33 is not limited to the display device 33A, the light emitting device 33B, and the sound outputting device 33C. Furthermore, at least one of the display device 33A, the light emitting device 33B, and the sound outputting device 33C may be omitted.

[Swinging Terrain Measurement]

Figure 4:
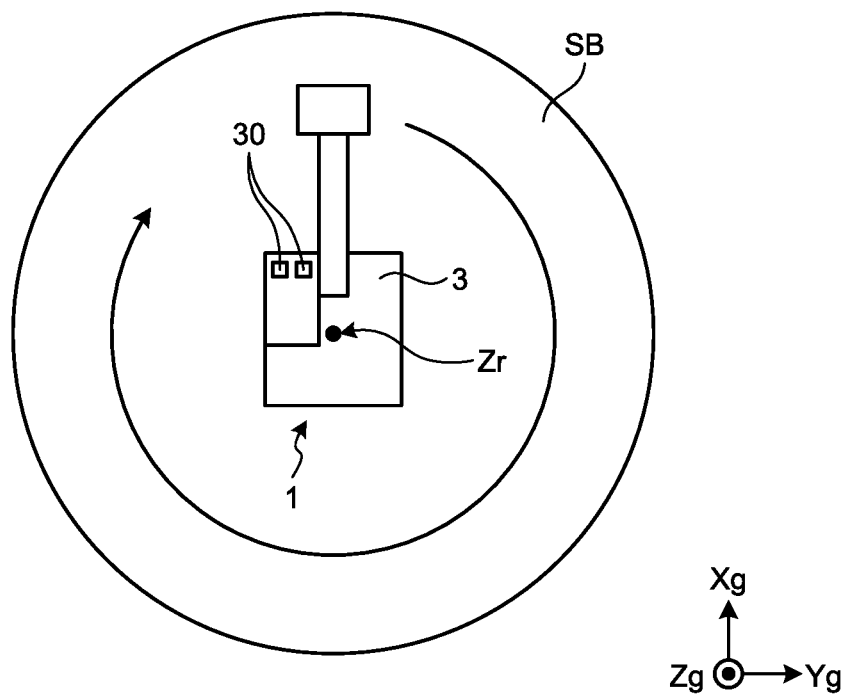
FIG. 4 is a diagram schematically illustrating an example of an operation performed by the work machine according to the present embodiment.

Next, an example of the operation performed by the excavator 1 according to the present embodiment will be described. FIG. 4 is a diagram schematically illustrating an example of the operation performed by the excavator 1 according to the present embodiment. The measurement system 50 sequentially captures the images PC of the work target SB around the excavator 1 using the image capturing devices 30 while the swinging body 3 is swinging. The image capturing device 30 sequentially captures the images PC of the work target SB at a predetermined interval, while the swinging body 3 is swinging.

The image capturing device 30 is mounted on the swinging body 3. When the swinging body 3 swings, an image capturing region FM of the image capturing device 30 moves in the swing direction RD. The image capturing device 30 can capture the images PC of a plurality of regions of the work target SB, by sequentially capturing the images PC of the work target SB while the swinging body 3 is swinging. The three-dimensional position calculation unit 417 can calculate the three-dimensional position of the work target SB around the excavator 1 by executing stereo processing on the pair of images PC captured by the pair of image capturing devices 30.

The three-dimensional position of the work target SB calculated by the stereo processing is defined in the image capturing device coordinate system. The three-dimensional position calculation unit 417 converts the three-dimensional position in the image capturing device coordinate system into a three-dimensional position in the on-site coordinate system. The position and orientation of the swinging body 3 on the on-site coordinate system are required for the conversion of the three-dimensional position in the image capturing device coordinate system into the three-dimensional position in the on-site coordinate system. The position and orientation of the swinging body 3 in the on-site coordinate system can be detected by the position detection device 23 and the orientation detection device 24.

While the excavator 1 is swinging, each of the position detection device 23 and the orientation detection device 24 mounted on the excavator 1 is displaced. The detection data output from each of the position detection device 23 and the orientation detection device 24 in a moving state may be unstable or may have low detection accuracy.

The position detection device 23 outputs detection data at a predetermined interval. Thus, the image capturing timing of the image capturing device 30 and the position detection timing of the position detection device 23 might fail to be synchronized when the detection of the position by the position detection device 23 and the image capturing by the image capturing device 30 are concurrently performed while the excavator 1 is swinging with the position detection device 23 moving. The measurement accuracy of the three-dimensional position might be degraded as a result of conversion of the three-dimensional position of the work target SB based on the detection data detected by the position detection device 23 at a timing different from the image capturing timing.

In the present embodiment, the measurement system 50 highly accurately calculates the position and orientation of the swinging body 3 at the time point at which the image capturing device 30 captures the image PC while the swinging body 3 is swinging, based on a method described later. Thus, the measurement system 50 can highly accurately calculate the three-dimensional position of the work target SB in the on-site coordinate system.

The image capturing position calculation unit 416 acquires detection data detected by each of the position detection device 23 and the orientation detection device 24 while the excavator 1 is in the operation stop state. The detection data as a result of the detection detected by the position detection device 23 and the orientation detection device 24 while the excavator 1 is in the operation stop state is likely to be stable. The image capturing position calculation unit 416 acquires the detection data detected during the operation stop state before and after the swinging of the swinging body 3 starts and ends. The image capturing device 30 captures the image PC of the work target SB in the operation stop state before and after the swinging of the swinging body 3 starts and ends. Based on the detection data obtained by each of the position detection device 23 and the orientation detection device 24 while the excavator 1 is in the operation stop state, the image capturing position calculation unit 416 converts the three-dimensional position of the work target SB in the image capturing device coordinate system, calculated from the images PC captured while the excavator 1 is in the operation stop state, into a three-dimensional position in the on-site coordinate system.

On the other hand, when the image capturing device 30 captures the image PC of the work target SB while the swinging body 3 is swinging, the image capturing position calculation unit 416 calculates the position and the orientation of the swinging body 3 at the time point at which the image capturing device 30 captures the image PC while the swinging body 3 is swinging. The image capturing position calculation unit 416 converts the three-dimensional position in the image capturing device coordinate system, calculated from the captured images PC, into the three-dimensional position in the on-site coordinate system based on the calculated position and orientation of the swinging body 3.

Figure 5:
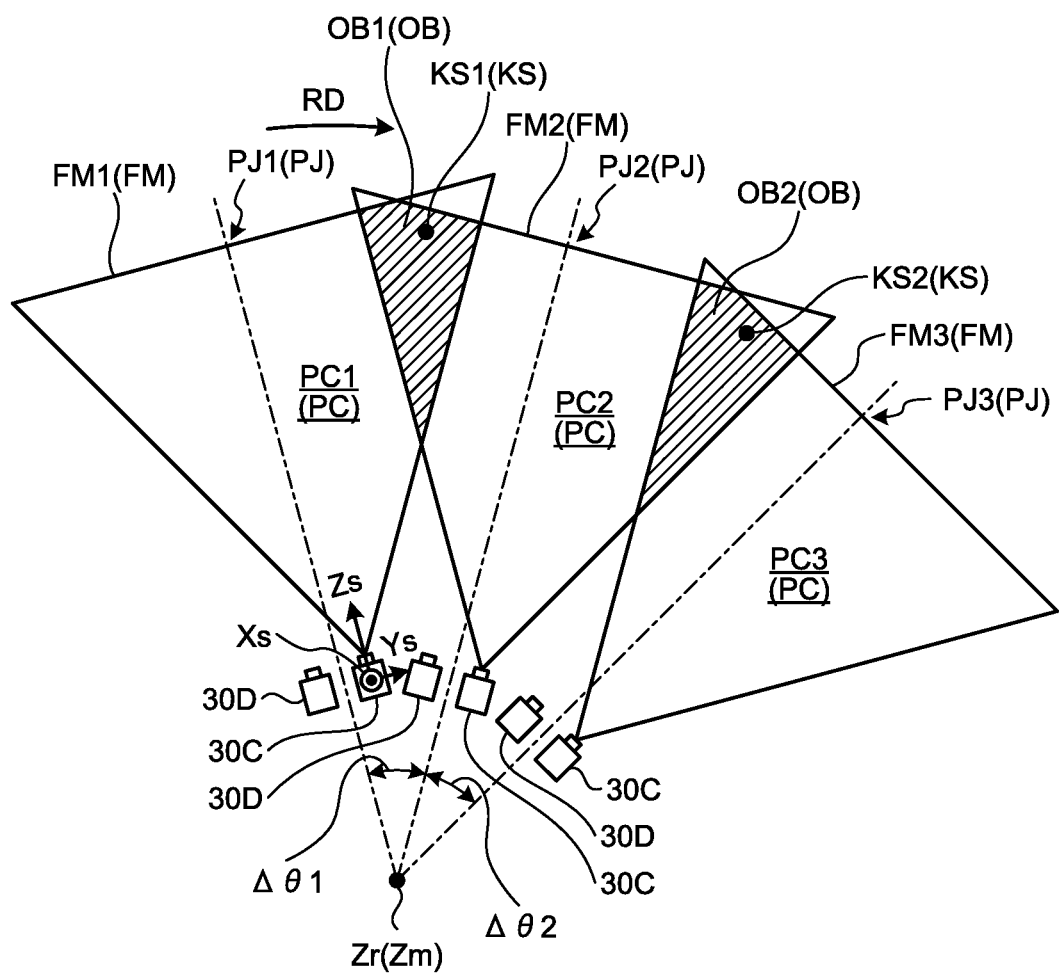
FIG. 5 is a diagram schematically illustrating an example of an operation performed by the measurement system according to the present embodiment.

FIG. 5 is a diagram schematically illustrating an example of an operation performed by the measurement system 50 according to the present embodiment. FIG. 5 is a schematic view used for describing how the image capturing device 30 captures images of the work target SB while the swinging body 3 is swinging.

In the following description, the traveling body 5 is assumed to be in a traveling stop state. As illustrated in FIG. 5, the swinging of the swinging body 3 results in the image capturing device 30, mounted on the swinging body 3, as well as the image capturing region FM of the image capturing device 30 moving in the swing direction RD. The image capturing region FM of the image capturing device 30 is defined based on the field of view of the optical system of the image capturing device 30. The image capturing device 30 acquires the image PC of the work target SB located within the image capturing region FM. The swinging of the swinging body 3 results in the image capturing region FM of the image capturing device 30 moving in the swing direction RD of the swinging body 3. The image capturing device 30 captures the images PC of the work target SB sequentially located within in the image capturing region FM thus moving.

FIG. 5 illustrates an example in which the image capturing region FM moves in the swing direction RD to be an image capturing region FM1, an image capturing region FM2, and an image capturing region FM3 in this order, due to the swinging of the swinging body 3. The image capturing region FM1 is defined at a first position PJ1 in the swing direction RD. The image capturing region FM2 is defined at a second position PJ2 in the swing direction RD. The image capturing region FM3 is defined at a third position PJ3 in the swing direction RD. The second position PJ2 is a position as a result of swinging from the first position PJ1 by a swing angle $\Delta\theta1$. The third position PJ3 is a position as a result of swinging from the second position PJ2 by a swing angle $\Delta\theta2$. The image capturing device 30 captures each of an image PC1 of the work target SB located within the image capturing region FM1, an image PC2 of the work target SB located within the image capturing region FM2, and an image PC3 of the work target SB located within the image capturing region FM3. The image PC1, the image PC2, and the image PC3 are images captured by the same image capturing device 30 (the image capturing device 30C in the example illustrated in FIG. 5).

The image capturing device 30 performs image capturing at a predetermined timing so that an overlapping range OB is provided in the adjacent image capturing regions FM. FIG. 5 illustrates an example in which an overlapping range OB1 is provided in the image capturing region FM1 and the image capturing region FM2, and an overlapping range OB2 is provided between the image capturing region FM2 and the image capturing region FM3. In the overlapping range OB1, the image PC1 and a part of the image PC2 overlap. In the overlapping range OB2, the image PC2 and a part of the image PC3 overlap.

The overlapping range OB includes the common part KS of the images PC. A common part KS1 in the overlapping range OB1 is the common part KS of the image PC1 and the image PC2. A common part KS2 in the overlapping range OB2 is the common part KS of the image PC2 and the image PC3. The common part extraction unit 413 extracts the common part KS of the plurality of two-dimensional images PC captured by the image capturing device 30.

Figure 6:
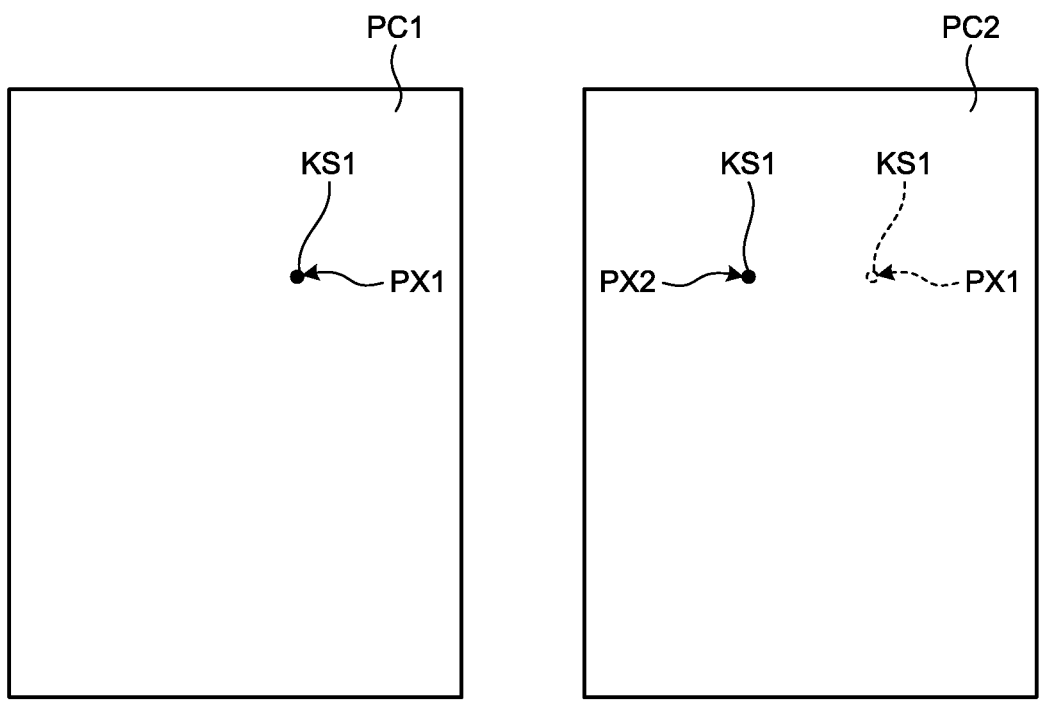
FIG. 6 is a schematic view illustrating an example of processing executed by the measurement system according to the present embodiment.

FIG. 6 is a schematic view illustrating an example of processing executed by the measurement system 50 according to the present embodiment. FIG. 6 is a diagram illustrating an example of the images PC (PC1 and PC2) captured while the swinging body 3 is swinging. The common part extraction unit 413 extracts the common part KS from the images PC.

As illustrated in FIG. 6, the common part extraction unit 413 extracts the common part KS1 of the image PC1 and the image PC2, from the image PC1 of the work target SB located within the image capturing region FM1 and the image PC2 of the work target SB located within the image capturing region FM2. The image capturing position calculation unit 416 calculates an estimated angle $\theta s$ ($\Delta\theta 1$ in FIG. 5) of the swinging body 3 based on the common part KS1 extracted by the common part extraction unit 413. The image capturing position calculation unit 416 further calculates an estimated position Ps (PJ2 in FIG. 5) of the image capturing device 30 at the time of image capturing, based on the estimated angle $\theta s$.

The common part KS corresponds to a feature point in the image PC. The common part extraction unit 413 extracts the common part KS based on a known feature point detection algorithm such as, for example, Oriented FAST and Rotated BRIEF (ORB) or Harris corner detection. The common part extraction unit 413 extracts a plurality of feature points from the plurality of respective images PC, and extracts the common part KS by searching the plurality of extracted feature points for similar feature points. The common part extraction unit 413 may extract a plurality of the common parts KS. The common part extraction unit 413 extracts, for example, a corner of the work target SB in the image PC as the feature point.

The image capturing region FM of the image capturing device 30 moves in the swing direction RD due to the swinging of the swinging body 3, and the movement of the image capturing region FM results in displacement of the common part KS in the image PC. In the example illustrated in FIG. 6, the common part KS is at a pixel position PX1 in the image PC1 and is at a pixel position PX2 in the image PC2. The position of the common part KS is different between the image PC1 and the image PC2. This means that the common part KS1 is displaced between the image PC1 and the image PC2. The image capturing position calculation unit 416 can calculate the swing angle $\Delta\theta 1$ between the position PJ1 and the position PJ2, based on the positions of the common part KS in the plurality of images PC.

Figure 7:
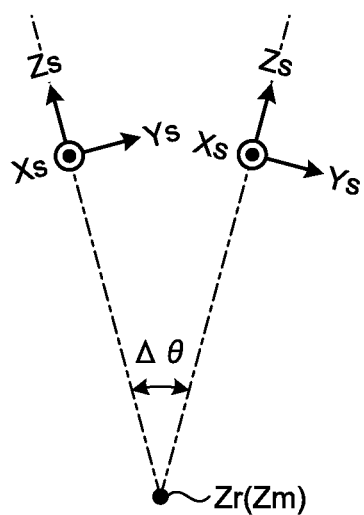
FIG. 7 is a schematic view illustrating an example of processing executed by the measurement system according to the present embodiment.

FIG. 7 is a schematic view illustrating an example of processing by the measurement system 50 according to the present embodiment. FIG. 7 is a diagram illustrating how of the image capturing device coordinate system (Xs, Ys, Zs) moves due to the swinging of the swinging body 3. As illustrated in FIG. 7, the swinging body 3 swings about the swing axis Zr on an Xm-Ym plane of the vehicle body coordinate system. When the swinging body 3 swings about the swing axis Zr by a swing angle $\Delta\theta$, the image capturing device coordinate system (Xs, Ys, Zs) moves about the swing axis Zr by the swing angle $\Delta\theta$. The image capturing position calculation unit 416 estimates the estimated angle $\theta s$ of the swinging body 3 and the estimated position Ps of the image capturing device 30 as a result of the swinging by the swinging body 3 by the swing angle $\Delta\theta$ from a pre-swinging angle $\theta ra$, under a constraint condition that the swinging body 3 swings about the swing axis Zr.

[Calculation of Estimated Angle]

Figure 8:
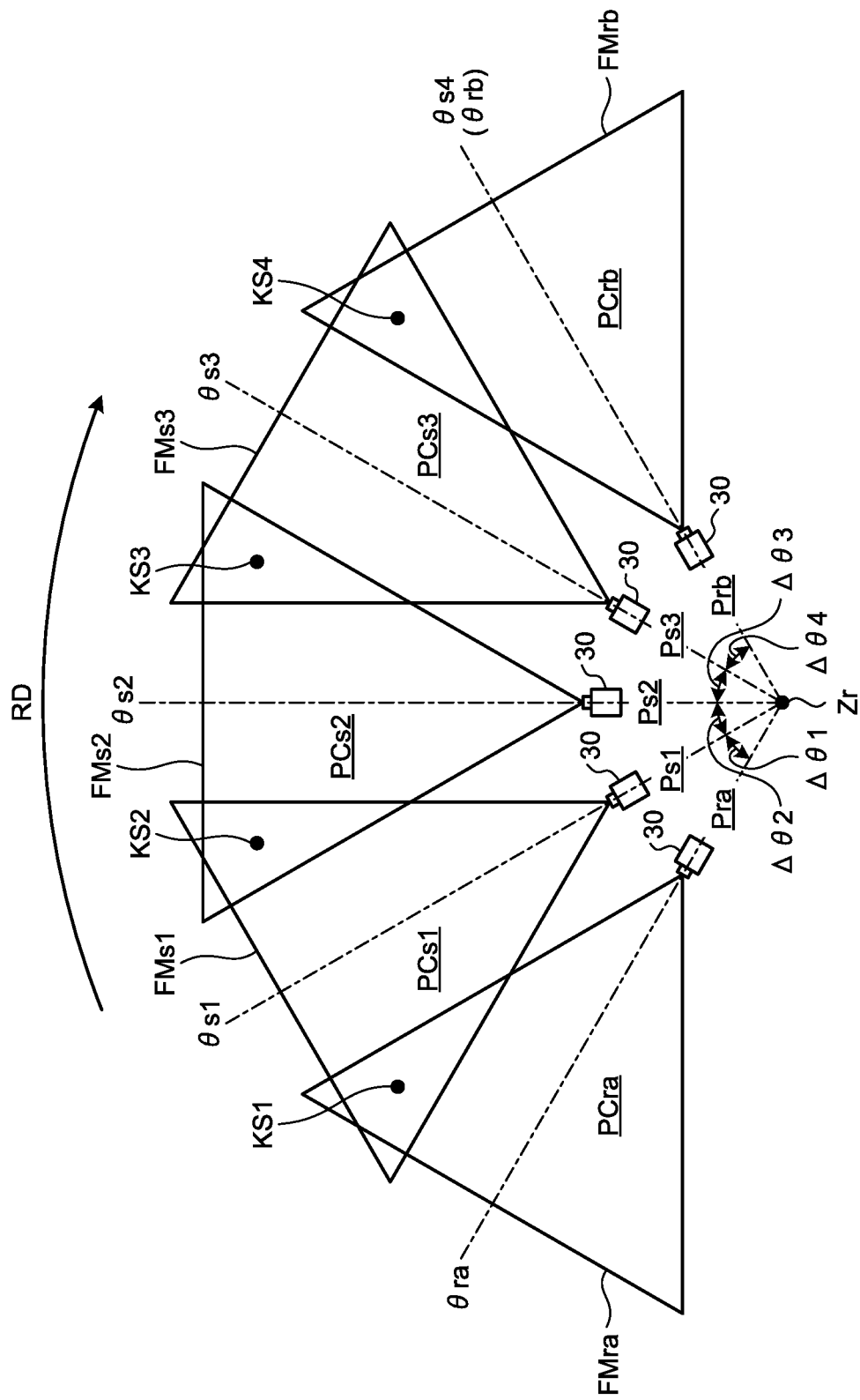
FIG. 8 is a schematic view illustrating an example of processing executed by the measurement system according to the present embodiment.

FIG. 8 is a schematic view illustrating an example of processing by the measurement system 50 according to the present embodiment. FIG. 8 is a schematic view illustrating an example of how a swing angle $\theta$ of the swinging body 3 and a position P of the image capturing device 30 are calculated. FIG. 8 illustrates the swing angle $\theta$ of the swinging body 3 and the position P of the image capturing device 30 in the vehicle body coordinate system.

In the example illustrated in FIG. 8, the swinging body 3 swings in the swing direction RD to be at the pre-swinging angle $\theta ra$, a first estimated angle $\theta s1$, a second estimated angle $\theta s2$, a third estimated angle $\theta s3$, and a post-swinging angle $\theta rb$ in this order. The image capturing device 30 moves to be at a pre-swinging position Pra, a first estimated position Ps1, a second estimated position Ps2, a third estimated position Ps3, and a post-swinging position Prb in this order, due to the swinging of the swinging body 3. The image capturing region FM of the image capturing device 30 moves to be an image capturing region FMra, an image capturing region FMs1, an image capturing region FMs2, an image capturing region FMs3, and an image capturing region FMrb in this order due to the movement of the image capturing device 30 in the swing direction RD.

The swinging body 3 at the pre-swinging angle $\theta ra$ and at the post-swinging angle $\theta rb$ is in a swinging stop state. The swinging body 3 at the pre-swinging angle $\theta ra$ and thus in the swinging stop state swings from the pre-swinging angle $\theta ra$ to the post-swinging angle $\theta rb$, to reach the post-swinging angle $\theta rb$ via the first estimated angle $\theta s1$, the second estimated angle $\theta s2$, and the third estimated angle $\theta s3$.

The image capturing device 30 acquires the image PCra of the work target SB located within the image capturing region FMra, in a state where the image capturing device 30 is located at the pre-swinging position Pra. The image capturing device 30 acquires the image PCs1 of the work target SB located within the image capturing region FMs1, in a state where the image capturing device 30 is located at the first estimated position Ps1. The image capturing device 30 acquires the image PCs2 of the work target SB located within the image capturing region FMs2, in a state where the image capturing device 30 is located at the second estimated position Ps2. The image capturing device 30 acquires the image PCs3 of the work target SB located within the image capturing region FMs3, in a state where the image capturing device 30 is located at the third estimated position Ps3. The image capturing device 30 acquires the image PCrb of the work target SB located within the image capturing region FMrb, in a state where the image capturing device 30 is located at the post-swinging position Prb.

In this manner, the image capturing position calculation unit 416 calculates the pre-swinging angle $\theta ra$, based on the position and orientation of the swinging body 3 detected by the position detection device 23 and the orientation detection device 24 in the swinging stop state before the swinging body 3 starts swinging. The image capturing position calculation unit 416 further calculates the post-swinging angle $\theta rb$, based on the position and orientation of the swinging body 3 detected by the position detection device 23 and the orientation detection device 24 in the swinging stop state after the swinging body 3 has stopped swinging. The image capturing position calculation unit 416 also calculates the pre-swinging position Pra based on the pre-swinging angle $\theta ra$. The image capturing position calculation unit 416 also calculates the post-swinging position Prb based on the post-swinging angle $\theta rb$.

The pre-swinging angle $\theta ra$, the post-swinging angle $\theta rb$, the pre-swinging position Pra, and the post-swinging position Prb are calculated with high accuracy based on the detection data obtained by the position detection device 23 and the detection data of the orientation detection device 24.

In this manner, the image capturing position calculation unit 416 estimates the estimated angle $\theta s$ (the first estimated angle θs1, the second estimated angle θs2, and the third estimated angle θs3) based on the common part KS in the plurality of images PC captured while the swinging body 3 is swinging. The image capturing position calculation unit 416 further calculates the estimated position Ps (the first estimated position Ps1, the second estimated position Ps2, and the third estimated position Ps3) based on the estimated angle θs.

The common part extraction unit 413 extracts the common part KS1 of the image PCra and the image PCs1. The image capturing position calculation unit 416 calculates a swing angle Δθ1 based on the pre-swinging angle θra of the swinging body 3 and the common part KS1 of the image PCra and the image PCs1, under the constraint condition that the swinging body 3 swings about the swing axis Zr. The first estimated angle θs1 is a sum of the pre-swinging correct angle θra and the swing angle Δθ1 (θs1=θra+Δθ1).

Similarly, the common part extraction unit 413 can calculate a swing angle Δθ2, a swing angle Δθ3, and a swing angle Δθ4, and the image capturing position calculation unit 416 can calculate a second estimated angle θs2 (θs2=θra+Δθ1+Δθ2), a third estimated angle θs3 (θs3=θra+Δθ1+Δθ2+Δθ3) and a fourth estimated angle θs4 (θs4=θra+Δθ1+Δθ2+Δθ3+Δθ4).

In this manner, the image capturing position calculation unit 416 can calculate the estimated angles θs (θs1, θs2, θs3, and θs4) of the swinging body 3 one by one with the image capturing device 30 capturing images while the swinging body 3 is swinging. Furthermore, with the estimated angle θs of the swinging body 3 calculated, the image capturing position calculation unit 416 can calculate the estimated positions Ps (Ps1, Ps2, Ps3, and Ps4) of the image capturing device 30 while the swinging body 3 is swinging, based on the estimated angle θs.

Furthermore, the image capturing position calculation unit 416 acquires, from the image capturing device 30, time point data indicating a time point at which each of the plurality of images PC (PCra, PCs1, PCs2, PCs3, PCs4, and PCrb) has been captured. The image capturing device 416 can calculate the swing speed V based on the time point at which each of the plurality of images PC is captured and the swing angle Δθ (Δθ1, Δθ2, Δθ3, Δθ4). For example, the swing angle V of the swinging body 3 swinging from the estimated angle θs1 to the estimated angle θs2 can be calculated based on a time period between the time point at which the image PCs1 has been captured and the time point at which the image PCs2 has been captured and an amount of movement from the estimated angle θs1 with which the image PCs1 has been captured to the estimated angle θs2. Furthermore, the image capturing device 416 can calculate the swing direction R based on the time point at which each of the plurality of images PC has been captured and the swing angle Δθ.

As described above, in the present embodiment, the image capturing position calculation unit 416 can calculate the swing data about the swinging body 3 including the swing angle θ, the swing speed V, and the swing direction R based on the common part KS in the plurality of images PC.

[Estimated Angle Correction]

The post-swinging angle θrb is calculated with high accuracy based on the detection data obtained by the position detection device 23 and the detection data obtained by the orientation detection device 24. On the other hand, the estimated angle θs4 is calculated based on the amount of displacement of the common part KS. If the estimated angle θs4 and the estimated position Ps4 calculated using the common part KS are accurate, the difference between the estimated angle θs4 and the post-swinging angle θrb is small, and the difference between the estimated position Ps4 and the post-swinging position Prb is small.

On the other hand, for example, the accumulated error of the displacement amount of the common part KS and the like may lead to a large error of the estimated angle θs4 and the estimated position Ps4 calculated using the common part KS. Such a large error of the estimated angle θs4 and the estimated position Ps4 results in a large difference between the estimated angle θs4 and the post-swinging angle θrb, and between the estimated position Ps4 and the post-swinging position Prb.

When there is a difference between the estimated angle θs4 and the post-swinging angle θrb, the image capturing position calculation unit 416 corrects the estimated angle θs (the first estimated angle θs1, the second estimated angle θs2, the third estimated angle θs3, and the fourth estimated angle θs4), which is the swing angle θ during the swinging, based on the angle θr (the pre-swinging angle θra and the post-swinging angle θrb) which is the swing angle θ in the swinging stop state. Furthermore, the image capturing position calculation unit 416 corrects the estimated position Ps based on the corrected estimated angle θs.

The image capturing position calculation unit 416 can accurately calculate the estimated position Ps1 of the image capturing device 30 at the time of capturing the image PCs1 based on a corrected estimated angle θs1'. Similarly, the image capturing position calculation unit 416 can accurately calculate the estimated position Ps2 of the image capturing device 30 at the time of capturing the image PCs2 based on a corrected estimated angle θs2', and can accurately calculate the estimated position Ps3 of the image capturing device 30 at the time of capturing the image PCs3 based on a corrected estimated angle θs3'. Thus, the three-dimensional position calculation unit 417 can highly accurately calculate the three-dimensional position of the work target SB in the on-site coordinate system, based on the highly accurately calculated estimated position Ps of the image capturing device 30 at the time of image capturing and the image PCs captured by this image capturing device 30.

[Three-Dimensional Data Integration]

The three-dimensional position calculation unit 417 executes stereo processing on a pair of images PC captured by the pair of image capturing devices 30, and calculates a three-dimensional position of the work target SB. Note that three-dimensional data integration may be omitted.

The three-dimensional position calculation unit 417 executes stereo processing on the pair of images PCra captured by the pair of image capturing devices 30 that are at the pre-swinging position Pra and thus are in the swinging stop state before the swinging body 3 starts to swing, to calculate the three-dimensional position of the work target SB located within the image capturing region FMra.

The three-dimensional position calculation unit 417 executes stereo processing on the pair of images PCs captured by the pair of image capturing devices 30 at the estimated position Ps while the swinging body 3 is swinging, to calculate the three-dimensional position of the work target SB located within the image capturing region FMs. The three-dimensional position calculation unit 417 executes stereo processing on the pair of images PCs captured by the pair of image capturing devices 30 at the estimated position Ps while the swinging body 3 is swinging with the traveling body 5 being in the traveling stop state, to calculate the three-dimensional position of the work target SB located within the image capturing region FMs.

Furthermore, the three-dimensional position calculation unit 417 executes stereo processing on the pair of images PCrb captured by the pair of image capturing devices 30 at the post-swinging position Prb in the swinging stop state after the swinging body 3 has stopped swinging, to calculate the three-dimensional position of the work target SB located within the image capturing region FMrb.

Furthermore, the three-dimensional position calculation unit 417 calculates the three-dimensional position of the work target SB based on the plurality of images PC captured while the swinging body 3 is swinging and is in the swinging stop state and then integrates the plurality of three-dimensional positions of the work target SB.

Figure 9:
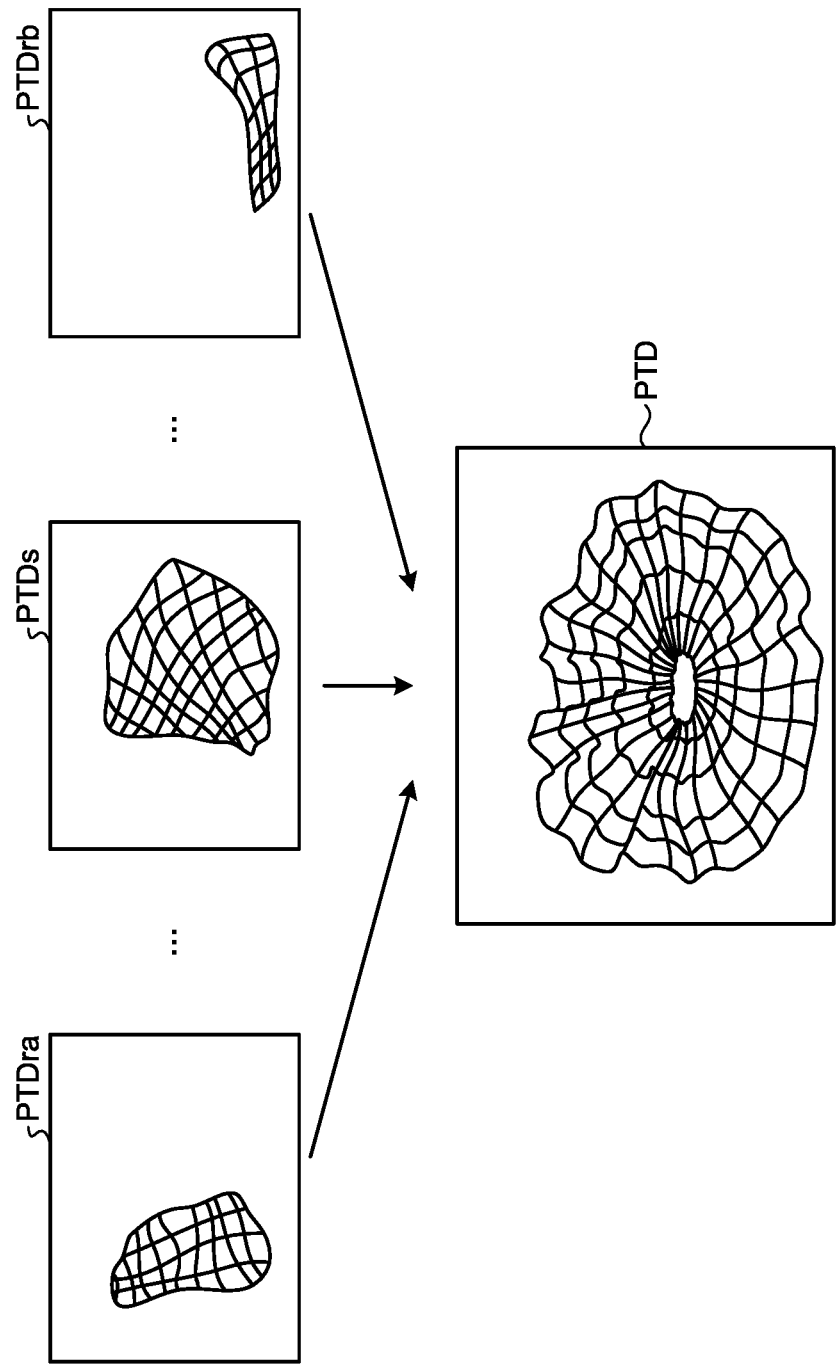
FIG. 9 is a diagram schematically illustrating an example of integration of three-dimensional positions of a target according to the present embodiment.

FIG. 9 is a diagram schematically illustrating an example of how three-dimensional positions of the work target SB are integrated according to the present embodiment. Three-dimensional data PTDra acquired in the swinging stop state before the swinging body 3 starts swinging, three-dimensional data PTDs acquired while the swinging body 3 is swinging, and three-dimensional data PTDrb acquired in the swinging stop state after the swinging body 3 has stopped swinging are integrated, and thus three-dimensional data PTD indicating the three-dimensional shape of the work target SB within a range in which the image capturing device 30 has captured the images PC of the work target SB around the excavator 1.

The three-dimensional data PTDra includes the three-dimensional position of the work target SB calculated from the image PC captured in the swing stop state before the swinging body 3 starts swinging. The three-dimensional data PTDs includes the three-dimensional position of the work target SB calculated from the image PC captured while the swinging body 3 is swinging. The three-dimensional data PTDs may be one or a plurality of pieces of data. The three-dimensional data PTDrb includes the three-dimensional position of the work target SB calculated from the image PC captured in the swing stop state after the swinging body 3 has stopped swinging.

The three-dimensional position calculation unit 417 integrates the plurality of pieces of three-dimensional data PTDra, PTDs, and PTDrb. The three-dimensional position calculation unit 417 combines Zg coordinates so that Xg coordinates and Yg coordinates of three-dimensional positions of the three-dimensional data pieces PTDra, PTDs, and PTDrb in the on-site coordinate system match. In this manner, the three-dimensional position of the work target SB acquired in the swinging stop state before the swinging starts, the three-dimensional position of the work target SB obtained during the swinging, and the three-dimensional position of the work target SB obtained in the swinging stop state after the swinging has ended are integrated.

By integrating the plurality of pieces of three-dimensional data PTDra, PTDs, PTDrb, the three-dimensional data PTD indicating the a part of three-dimensional shape of the work target SB, around the excavator 1, within the region in which the image capturing device 30 has captured the images PC of the work target SB around the excavator 1 is generated.

[Swinging Condition]

Next, the swinging condition will be described. The swinging condition is a swinging condition of the swinging body 3 enabling suppression of degradation of the measurement accuracy of stereo measurement. If the swinging body 3 swings without satisfying the swinging condition, the measurement accuracy of the stereo measurement may be degraded. A predefined swinging condition is determined in advance and stored in the swinging condition storage unit 422 of the storage device 42.

In the present embodiment, the swinging condition storage unit 422 stores a first swinging condition requiring the swinging (re-swinging) to be not performed after the swinging body 3 has swung from the swinging start position to the swinging stop position and then stopped swinging. The first swinging condition includes a condition requiring the swinging body 3 that has stopped swinging not to start swinging again within a predetermined period of time after the swinging stop. The swing direction of the re-swinging may be any one of forward and reverse directions. When the driver of the excavator 1 stops the swinging by setting the operation device 35 to be in a neutral state and operates the input device 32, the swinging and image capturing end. In a case that the image capturing device 30 sequentially captures the images PC while the swinging body 3 is swinging, the measurement accuracy of the stereo measurement might be degraded when the swinging body 3 that has stopped swinging upon reaching the swinging stop position from the swinging start position starts swinging again in the forward or reverse direction.

The determination unit 413 determines whether the swing data of the swinging body 3 satisfies the first swinging condition. When it is determined that the swinging body 3 has stopped swinging and that the swinging has been terminated without re-swinging, it is determined that the swing data satisfies the first swinging condition. In other words, it is determined that the image PC with which the degradation of the measurement accuracy of the stereo measurement can be suppressed has been captured. On the other hand, when it is determined that the swinging body 3 has started swinging again after stopping the swinging, it is determined that the swing data does not satisfy the first swinging condition. In other words, it is determined that the measurement accuracy of stereo measurement might be degraded.

The swinging condition storage unit 422 further stores a second swinging condition, which is a swinging condition requiring the swing speed V of the swinging body 3 to be lower than a predefined speed. In a case that the image capturing device 30 sequentially captures the images PC while the swinging body 3 is swinging, an excessively high swing speed V of the swinging body 3 might result in the captured images PC being blurred or distorted. Thus, the stereo processing executed using such resultant images PC might result in degradation of the measurement accuracy of the stereo measurement. Furthermore, swinging of the swinging body 3 in a state where the excavator 1 is at a slope might result in an unintentionally high swing speed V due to the weight of the swinging body 3. Also in such a case, the measurement accuracy of stereo measurement may be degraded.

The determination unit 413 determines whether or not the swing data about the swinging body 3 satisfies the second swinging condition. When the swing speed V of the swinging body 3 is determined to be lower than the predefined speed and thus is determined to be low, it is determined that the swing data satisfies the second swinging condition. In other words, it is determined that the image PC with which the degradation of the measurement accuracy of the stereo measurement can be suppressed has been captured. On the other hand, when the swing speed C of the swinging body 3 is determined to be equal to or higher than the predefined speed and thus is determined to be excessively high, it is determined that the swing data does not satisfy the second swinging condition. In other words, it is determined that the measurement accuracy of stereo measurement might be degraded.

The swinging condition storage unit 422 further stores a third swinging condition including one or both of: a swinging condition requiring the swing angle θ of the swinging body 3 from the swinging start position to the swinging stop position to be larger than a first predefined angle; and a swinging condition requiring a swing angle θ2 to be smaller than a second predefined angle. In a case that the image capturing device 30 sequentially captures the images PC while the swinging body 3 is swinging, an excessive small swing angle θ (which is equal to or smaller than the first predefined angle) cannot be accurately corrected and thus might result in degradation of the accuracy of the stereo measurement. An excessively large swing angle θ (which is larger than the second predefined angle) might involve a large accumulated error in the estimated angle θs calculated which may result in degradation of the measurement accuracy of the stereo measurement.

The determination unit 413 determines whether or not the swing data about the swinging body 3 satisfies the third swinging condition. It is determined that the swing data satisfies the third swinging condition when the swing angle θ of the swinging body 3 from the swinging start position to the swinging stop position is determined to be larger than the first predefined angle or to be smaller than the second predefined angle. In other words, it is determined that the image PC with which the degradation of the measurement accuracy of the stereo measurement can be suppressed has been captured. It is determined that the swing data does not satisfy the third swinging condition when the swing angle θ of the swinging body 3 from the swinging start position to the swinging stop position is determined to be equal to or smaller than the first predefined angle or equal to or larger than the second predefined angle. In other words, it is determined that the measurement accuracy of stereo measurement might be degraded.

The swinging condition storage unit 422 further stores, as a fourth swinging condition, a swinging condition requiring the swing direction R of the swinging body 3 to be a single direction. In a case that the image capturing device 30 sequentially captures the images PC while the swinging body 3 is swinging, an image of the same region of the work target SB is captured twice if the swinging body 3 that has been swinging in the forward direction, to swing from the swinging start position to the swinging stop position, swings in the reverse direction. The stereo processing on a plurality of images PC as a result of capturing images of the same region of the work target SB might result in degradation of the measurement accuracy of the stereo measurement.

The determination unit 413 determines whether or not the swing data of the swinging body 3 satisfies the fourth swinging condition. It is determined that the swing data satisfies the fourth swinging condition when the swinging body 3 is determined to have swung in a single direction (forward direction) only, with not switching of the swing direction from the forward direction to the reverse direction before the swinging body 3 reaches the swinging stop position. In other words, it is determined that the image PC with which the degradation of the measurement accuracy of the stereo measurement can be suppressed has been captured. On the other hand, it is determined that the swing data does not satisfy the fourth swinging condition when the swing direction is determined to have switched from the forward direction to the reverse direction before the swinging body 3 reaches the swinging stop position. In other words, it is determined that the measurement accuracy of stereo measurement might be degraded.

The swinging condition storage unit 422 further stores, as the fifth swinging condition, a swinging condition requiring a difference between the post-swinging angle θrb of the image capturing device 30 after the swinging has ended, calculated based on the position and orientation of the swinging body 3 detected by the position detection device 23 and the orientation detection device 24, and the estimated angle θs of the image capturing device 30 after the swinging has ended, calculated based on the common part KS, to be smaller than a predefined value. A large difference between the post-swinging angle θrb and the estimated angle θs indicates a large deviation of the estimated angle θs from the actual swing angle θ. For example, accumulated errors of a plurality of common parts KS calculated from a plurality of images PC and the like may result in a large difference between the post-swinging angle θrb calculated based on the detection data obtained by the position detection device 23 and detection data obtained by the orientation detection device 24, and the estimated angle θs of the swinging body 3 after the swinging has ended, calculated based on the common part KS. A lower accuracy of the estimated angle θs results in a larger difference between the estimated angle θs and the post-swinging angle θrb. An inaccurate estimated angle θs leads to stereo processing executed on the image PC of the work target SB captured at a position different from the actual swing angle θ, resulting in degradation of the measurement accuracy of the stereo measurement.

The determination unit 413 determines whether or not the swing data about the swinging body 3 satisfies the fifth swinging condition. It is determined that the swing data satisfies the fifth swinging condition when the difference between the post-swinging angle θrb after the swinging has ended and the estimated angle θs after the swinging has ended is determined to be smaller than the predefined value. In other words, it is determined that the image PC with which the degradation of the measurement accuracy of the stereo measurement can be suppressed has been captured. It is determined that the swing data does not satisfy the fifth swinging condition when the difference between the post-swinging angle θrb after the swinging has ended and the estimated angle θs after the swinging has ended is determined to be equal to or larger than the predefined value. In other words, it is determined that the measurement accuracy of stereo measurement is likely to be degraded.

Note that the swinging condition storage unit 422 may store, as the fifth swinging condition, a swinging condition requiring a difference between the post-swinging position Prb after the swinging has ended and the estimated position Ps after the swinging has ended to be smaller than a predefined value.

The notification control unit 419 activates the notification device 33 when it is determined that the swing data of the swinging body 3 does not satisfy the swinging condition. In response to this, the driver can adjust the operation on the operation device 35 to prevent the degradation of the measurement accuracy of the stereo measurement, and can redo the image capturing.

The determination on whether or not the swing data satisfies the swinging condition, and the activation of the notification device 33 may be performed at any timing. The determination on whether or not the swing data satisfies the swinging condition, and the activation of the notification device 33 may be performed during a period between start and end of the swinging of the swinging body 3, may be performed after the swinging of the swinging body 3 and the image capturing by the image capturing device 30 have ended, or may be performed after the completion of the calculation of the estimated angle θs.

In the present embodiment, the determination on whether or not the swing data satisfies the first swinging condition, and the activation of the notification device 33 are performed in the period between start and end of the swinging of the swinging body 3. The determination on whether or not the swing data satisfies the second, third, or fourth swinging condition, and the activation of the notification device 33 are performed after the swinging of the swinging body 3 and the image capturing by the image capturing device 30 have ended. The determination on whether or not the swing data satisfies the fifth swinging condition, and the activation of the notification device 33 are performed after the completion of the calculation of the estimated angle θs.

Note that the predefined swinging conditions described above are merely an example, and thus the example described above should not be construed in a limiting sense. Furthermore, the timings of the determination on whether or not the swing data satisfies the swinging condition and the activation of the notification device 33 are also merely an example, and thus the example described above should not be construed in a limiting sense.

[Input Device]

Figure 10:
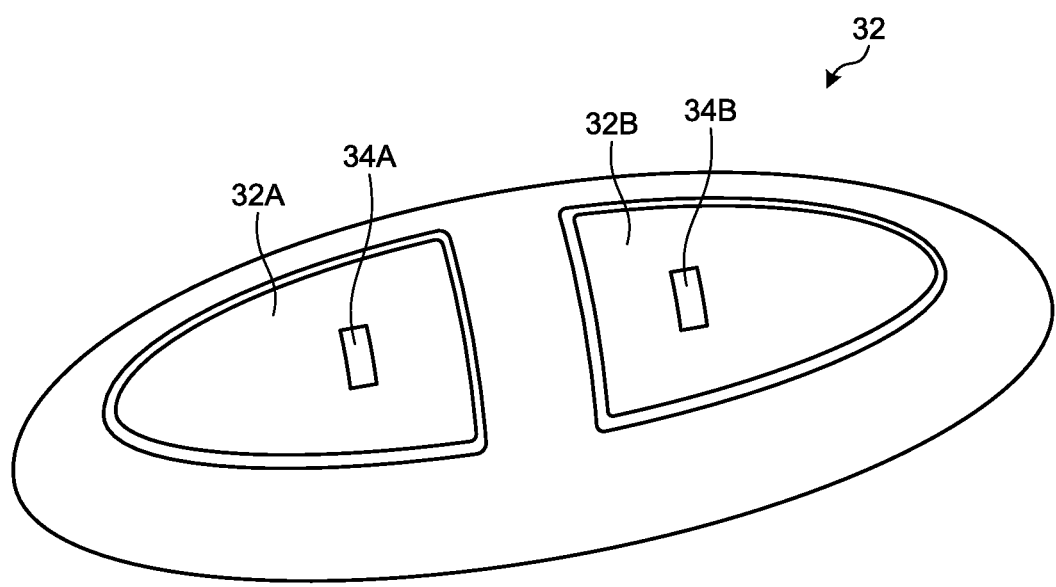
FIG. 10 is a perspective view schematically illustrating an example of an input device according to the present embodiment.

FIG. 10 is a perspective view schematically illustrating an example of the input device 32 according to the present embodiment. In the present embodiment, the measurement system 50 can implement swinging sequential image capturing mode in which the image capturing device 30 sequentially captures images of the work target SB while the swinging body 3 is swinging, and a single image capturing mode in which the image capturing device 30 captures an image of the work target SB while the swinging body 3 is in the swinging stop state. The input device 32 includes a swinging sequential image capturing switch 32A and a single image capturing switch 32B. The swinging sequential image capturing switch 32A can be used for generating an image capturing start instruction signal for instructing the initiation of the swinging sequential image capturing mode and an image capturing end instruction signal for instructing termination of the swinging sequential image capturing mode. The single image capturing switch 32B can be used for generating a single image capturing start instruction signal for instructing initiation of image capturing in the single image capturing mode. In addition, a first light emitting unit 34A is provided in a part of the swinging sequential image capturing switch 32A, and a second light emitting unit 34B is provided in a part of the single image capturing switch 32B. Each of the first light emitting unit 34A and the second light emitting unit 34B includes a light emitting diode. The first light emitting unit 34A is turned ON, blinks, or is turned OFF based on an operation state of the swinging sequential image capturing switch 32A. The second light emitting unit 34B is turned on, blinks, or is turned off based on an operation state of the single image capturing switch 32B. For example, when an image capturing disabled state transitions to an image capturing standby state, the notification control unit 419 turns ON, at a time point t1, each of the first light emitting unit 34A and the second light emitting unit 34B that have been turned OFF.

[Measurement Method]

Figure 11:
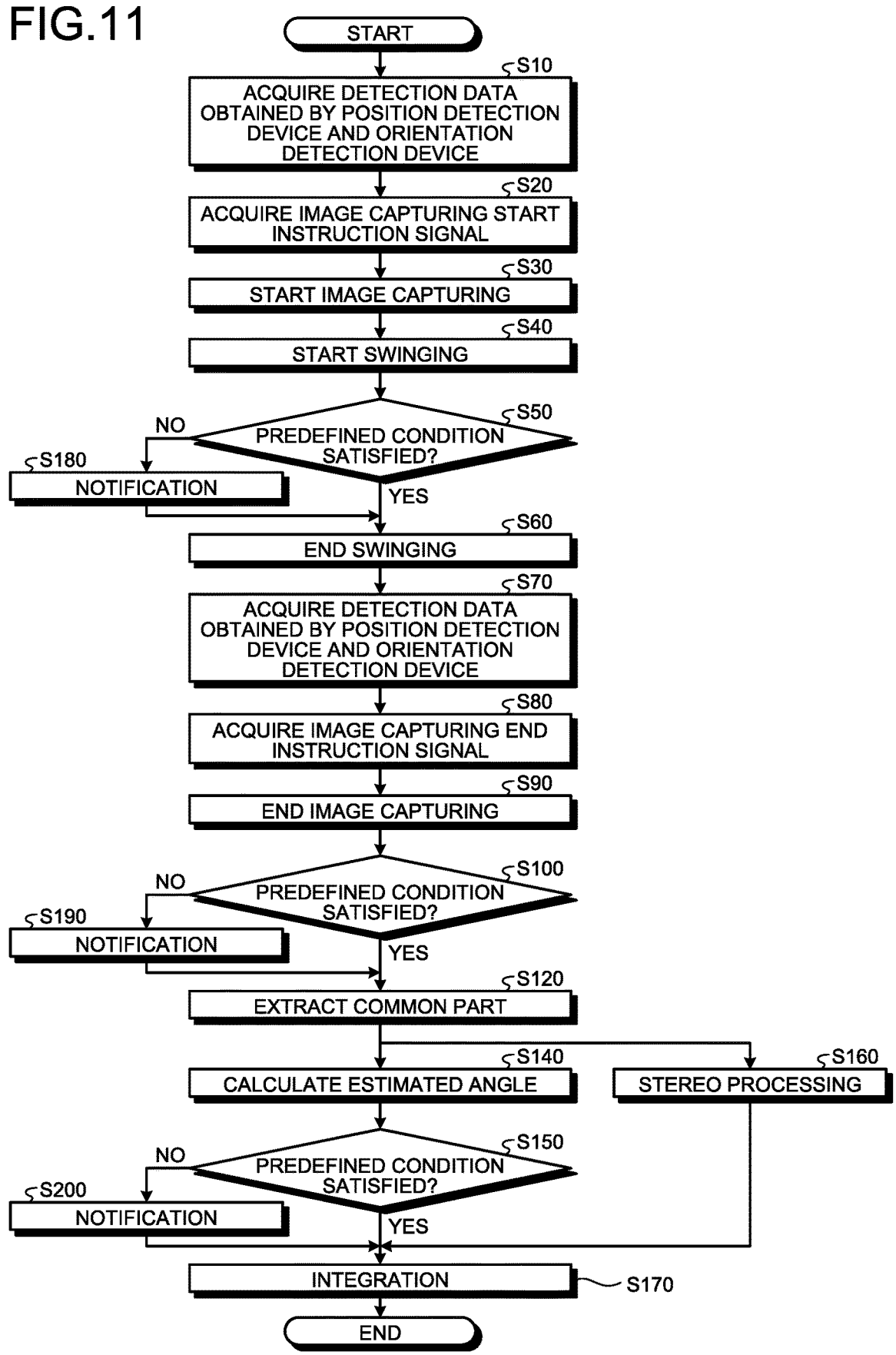
FIG. 11 is a flowchart illustrating an example of a measurement method according to the present embodiment.
Figure 12:
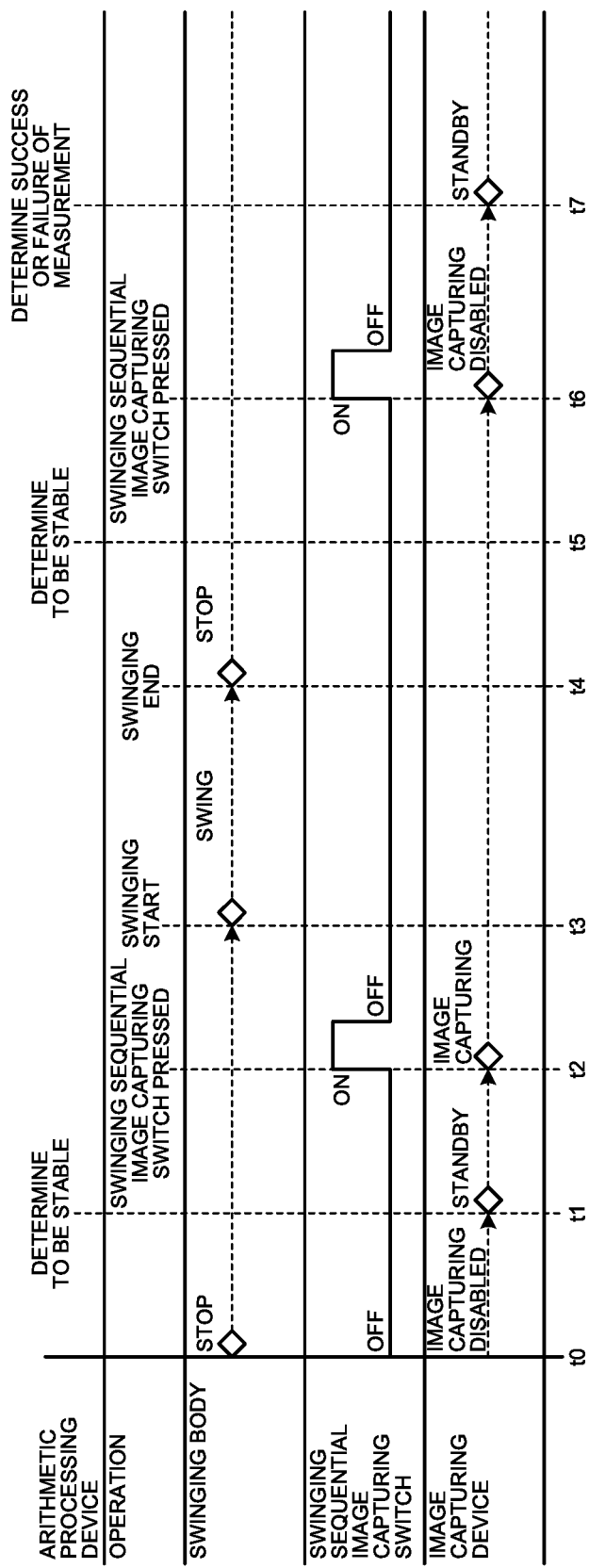
FIG. 12 is a timing chart of the measurement method according to the present embodiment.

FIG. 11 is a flowchart illustrating an example of a measurement method according to the present embodiment. FIG. 12 is a timing chart of the measurement method according to the present embodiment.

The driver of the excavator 1 operates the operation device 35 to make the swinging body 3 swing so that the image capturing device 30 faces the measurement start position for the work target SB. At the time point t1 after a predetermined period of time from a time point t0 at which the operation of the excavator 1 including the swinging of the swinging body 3 ends, the determination unit 418 determines that the position detection device 23 and the orientation detection device 24 are each in a stationary state of being capable of stably outputting detection data.

Upon receiving the image capturing start instruction signal while the excavator 1 is in the operation stop state and the position detection device 32 and the orientation detection device 24 are in a stationary state, the image capturing position calculation unit 416 acquires the detection data, indicating the position of the swinging body 3, from the position detection device 23 and acquires the detection data, indicating the orientation of the swinging body 3, from the orientation detection device (step S10).

The image capturing position calculation unit 416 acquires the pre-swinging angle θra and the pre-swinging position Pra.

The detection data from the position detection device 23 and the detection data from the orientation detection device 24 are temporarily stored in the storage device 42.

To activate the swinging sequential image capturing mode, the driver of the excavator 1 operates (presses) the swinging sequential image capturing switch 32A. In the example shown in FIG. 18, the swinging sequential image capturing switch 32A is operated at a time point t2. The image capturing start instruction signal generated in response to the operation on the swinging sequential image capturing switch 32A is output to the arithmetic processing device 41. The signal acquisition unit 411 acquires the image capturing start instruction signal (step S20).

The arithmetic processing device 41 starts the image capturing with the image capturing devices 30, upon acquiring the image capturing start instruction signal as a result of the operation on the swinging sequential image capturing switch 32A (step S30). The image acquisition unit 410 acquires the image PCra of the work target SB captured by the image capturing device 30 during the operation stop state before the excavator 1 starts operating. Further, the image storage unit 423 stores the image PCra.

The driver operates the operation device 35 to start the swinging of the swinging body 3 in a state in which the traveling of the traveling body 5 is stopped (step S40). The driver operates the operation device 35 to cause the swinging body 3 to swing from the swinging start position, with the image capturing device 30 facing the measurement start position of the work target SB, to the swinging stop position, with the image capturing device 30 stepping on the measurement end position of the work target SB.

In the example illustrated in FIG. 18, the operation device 35 is operated at a time point t3 to start the swinging of the swinging body 3. Each of the plurality of image capturing devices 30 (30A, 30B, 30C, and 30D) captures an image PCs of the work target SB a plurality of times at an interval while the swinging body 3 is swinging.

The image acquisition unit 410 sequentially acquires the plurality of images PCs of the work target SB captured by the image capturing devices 30 while the swinging body 3 is swinging. The image storage unit 423 sequentially stores the plurality of image PCs.

While the swinging body 3 is swinging, the image capturing position calculation unit 416 calculates swing data. The determination unit 418 determines whether or not the swing data satisfies the swinging conditions stored in the swing data storage unit 422 (step S50). The swing data is temporarily stored in the storage device 42.

In step S50, it is determined whether or not the swinging condition, which is the condition requiring the swinging to be terminated without re-swinging of the swinging body 3 that has stopped swinging (first swinging condition), is satisfied. When it is determined that the swinging has been terminated without the re-swinging by the swinging body 3, it is determined that the swing data satisfies the swinging condition. On the other hand, when the swinging body 3 is determined to have started to swing again after within a predefined period of time after the swinging stop, it is determined that the swing data does not satisfy the swinging condition.

When it is determined in step S50 that the swing data does not satisfy the swinging conditions (step S50: No), the notification control unit 419 activates the notification device 33 to notify the driver of information indicating that the swing data does not satisfy the swinging condition (step S180).

When it is determined in step S50 that the swing data satisfies the swinging condition (step S50: Yes), the notification device 33 is not activated. When it is determined in step S50 that the swinging body data satisfies the swinging condition, the notification control unit 419 may activate the notification device 33 under a notification mode different from the notification mode in step S180 to notify the driver of information indicating that the swing data satisfies the swinging condition.

When the swinging body 3 reaches the swinging stop position, the driver releases the operation on the operation device 35 and terminates the swinging of the swinging body 3 (step S60). In the example illustrated in FIG. 12, the operation on the operation device 35 is released and the swinging of the swinging body 3 is terminated at a time point t4.

At the time point t5 after a predetermined period of time from the time point t4 at which the swinging of the swinging body 3 has stopped, the determination unit 418 determines that the position detection device 23 and the orientation detection device 24 are each in a stationary state of being capable of stably outputting detection data.

While the excavator 1 is in the operation stop state and the position detection device 32 and the orientation detection device 24 are in a stationary state, the image capturing position calculation unit 416 acquires the detection data, indicating the position of the swinging body 3, from the position detection device 23 and acquires the detection data, indicating the orientation of the swinging body 3, from the orientation detection device 24 (step S70).

The image capturing position calculation unit 416 acquires the post-swinging angle θrb and the post-swinging position Prb.

The detection data from the position detection device 23 and the detection data from the orientation detection device 24 are temporarily stored in the storage device 42.

The image acquisition unit 410 acquires the image PCrb of the work target SB captured by the image capturing device 30 after the excavator 1 has stopped operating and thus is in an operation stop state. The image storage unit 423 stores the image PCrb.

To end the swinging sequential image capturing mode, the driver of the excavator 1 operates (presses) the swinging sequential image capturing switch 32A. In the example shown in FIG. 18, the swinging sequential image capturing switch 32A is operated at a time point t6. The image capturing end instruction signal, generated in response to the operation on the swinging sequential image capturing switch 32A, is output to the arithmetic processing device 41. The signal acquisition unit 411 acquires the image capturing end instruction signal (step S80).

When the image capturing end signal is acquired, the image capturing by the image capturing device 30 ends (step S90). The image capturing device 30 transitions to the image capturing disabled state.

The determination unit 418 determines whether or not the swing data obtained while the swinging body 3 is swinging satisfies the swinging conditions stored in the swing data storage unit 422 (step S100).

In step S100, the determination unit 418 determines whether a swinging condition, which is a condition requiring the swing speed V of the swinging body 3 to be lower than the predefined speed (second swinging condition), is satisfied.

When it is determined that the swing speed V of the swinging body 3 is lower than the predefined speed, it is determined that the swing data satisfies the swinging condition. On the other hand, when it is determined that the swing speed V of the swinging body 3 is equal to or higher than the predefined speed, it is determined that the swing data does satisfy the swinging condition.

Furthermore, in step S100, determination unit 418 determines whether or not one or both of the condition requiring the swing angle θ of the swinging body 3 from the swinging start position to the swinging stop position to be larger than the first predefined angle and the condition requiring the swing angle θ to be smaller than the second predefined angle (third swinging condition) is satisfied.

When the swing angle θ of the swinging body 3 is determined to be larger than the first predefined angle, it is determined that the swing data satisfies the swinging condition. On the other hand, when the swing angle θ of the swinging body 3 is determined to be equal to or smaller than the first predefined angle, it is determined that the swing data does not satisfy the swinging condition. On the other hand, when the swing angle θ of the swinging body 3 is determined to be smaller than the second predefined angle, it is determined that the swing data satisfies the swinging condition. On the other hand, when the swing angle θ of the swinging body 3 is determined to be equal to or larger than the second predefined angle, it is determined that the swing data does not satisfy the swinging condition.

In step S100, the determination unit 418 determines whether a swinging condition, which is a condition requiring the swing direction of the swinging body 3 to be a single direction (fourth swinging condition), is satisfied.

When the swing direction of the swinging body 3 is determined to be a single direction (forward direction), it is determined that the swing data satisfies the swinging condition. On the other hand, it is determined that the swing data does not satisfy the swinging condition when the swing direction of the swinging body 3 is determined to have switched from the forward direction to the reverse direction.

When it is determined in step S100 that the swing data does not satisfy the swinging conditions (step S100: No), the notification control unit 419 activates the notification device 33 to notify the driver of information indicating that the swing data does not satisfy the swinging condition (step S190).

When it is determined in step S100 that the swing data satisfies the swinging condition (step S50: Yes), the notification device 33 is not activated. When it is determined in step S100 that the swinging body data satisfies the swinging condition, the notification control unit 419 may activate the notification device 33 under a notification mode different from the notification mode in step S190 to notify the driver of information indicating that the swing data satisfies the swinging condition.

The common part extraction unit 413 extracts the common part KS from each of the plurality of images PC stored in the image storage unit 423 (step S120).

From at least two images PC captured by the image capturing device 30 while the swinging body 3 is stopped and while the swinging body 3 is swinging, the common part extraction unit 413 extracts the common part KS of the two images PC. The extraction of the common part KS is performed on all the images PC acquired during a period between the start and end of the swinging of the swinging body 3 in the swing direction R of the swinging body 3.

Next, the image capturing position calculation unit 416 estimates the estimated angle θs of the swinging body 3 based on the common part KS of the plurality of images PC (step S140). The image capturing position calculation unit 416 can calculate the swing angle Δθ, based on the positions of the common part KS in the plurality of images PC, to estimate the estimated angle θs.

The determination unit 418 determines whether or not the swing data obtained while the swinging body 3 is swinging satisfies the swinging conditions stored in the swing data storage unit 422 (step S150).

In step S150, the determination unit 418 determines whether or not a swinging condition, which is a condition requiring a difference between the post-swinging angle θrb of the image capturing device 30 after the swinging has ended, calculated based on the position and orientation of the swinging body 3 detected by the position detection device 23 and the orientation detection device 24, and the estimated angle θs of the image capturing device 30 after the swinging has ended, calculated based on the common part KS, to be smaller than a predefined value (fifth swinging condition), is satisfied.

In other words, the determination unit 418 determines whether or not a condition requiring the difference between the post-swinging angle θrb in the swinging stop state after the swinging has ended and the estimated angle θs after the swinging has ended estimated from the estimated angle θs during the swinging to be smaller than the predefined value is satisfied. For example, accumulated errors of a plurality of common parts KS calculated from a plurality of images PC and the like may result in a large difference between the post-swinging angle θrb calculated based on the detection data obtained by the position detection device 23 and detection data obtained by the orientation detection device 24, and the estimated angle θs of the swinging body 3 after the swinging has ended, calculated based on the common part KS. A lower accuracy of the estimated angle θs results in a larger difference between the estimated angle θs and the post-swinging angle θrb. The determination unit 418 determines whether or not the condition requiring the difference between the estimated angle θs after the swinging has ended and the post-swinging angle θrb to be smaller than the predefined value is satisfied.

It is determined that the swing data satisfies the swinging condition when the difference between the post-swinging angle θrb after the swinging has ended and the estimated angle θs after the swinging has ended is determined to be smaller than the predefined value. On the other hand, it is determined that the swing data does not satisfy the swinging condition when the difference between the post-swinging angle θrb after the swinging has ended and the estimated angle θs after the swinging has ended is determined to be equal to or larger than the predefined value.

When it is determined in step S150 that the swing data does not satisfy the swinging conditions (step S150: No), the notification control unit 419 activates the notification device 33 to notify the driver of information indicating that the swing data does not satisfy the swinging condition (step S200).

When it is determined in step S150 that the swing data satisfies the swinging condition (step S150: Yes), the notification device 33 is not activated. When it is determined in step S150 that the swinging body data satisfies the swinging condition, the notification control unit 419 may activate the notification device 33 under a notification mode different from the notification mode in step S200 to notify the driver of information indicating that the swing data satisfies the swinging condition.

When the difference between the estimated angle θs after the swinging has ended and the post-swinging angle θrb is smaller than the predefined value, the image capturing position calculation unit 416 corrects the estimated angle θs during the swinging, based on the angle θr (pre-swinging angle θra, post-swinging angle θrb). Furthermore, the image capturing position calculation unit 416 corrects the estimated position Ps of the image capturing device 30 during the swinging, based on the corrected estimated angle θs. The image capturing position calculation unit 416 can correct the estimated angle θs based on the above-described procedure.

The three-dimensional position calculation unit 417 performs stereo processing on the images PC at the time of image capturing to calculate a plurality of three-dimensional positions of the work target SB in the image capturing device coordinate system (step S160). The three-dimensional position calculation unit 417 converts the three-dimensional position in the image capturing device coordinate system into a three-dimensional position in the on-site coordinate system.

The three-dimensional position calculation unit 417 integrates the plurality of three-dimensional positions of the work target SB calculated in step S130 based on the position P of the image capturing device 30 at the time of image capturing acquired in step S140 (step S170). The position P of the image capturing device 30 at the time of image capturing includes a pre-swinging position Pra, a plurality of estimated positions Ps during swinging, and a post-swinging position Prb. By integrating the plurality of work targets SB, as described with reference to FIG. 9, three-dimensional data PTD indicating the three-dimensional shape of the work target SB is generated. The process of integrating three-dimensional positions may be omitted.

When it is determined that the swinging body data does not satisfy at least one of the first swinging condition, the second swinging condition, the third swinging condition, the fourth swinging condition, and the fifth swinging condition, the three-dimensional position calculation unit 417 may calculate the three-dimensional position of the work target SB in the image capturing device coordinate system, through the stereo processing on the image PCra of the work target SB captured by the image capturing device 30 in step S30 in the operation stop state before the excavator 1 starts operating and on the image PCrb of the work target SB captured by the image capturing device 30 in step S80 in the operation stop state after the excavator 1 has stopped operating.

[Notification Device]

The notification by the notification device 33 in step S180, step S190, and step S200 includes at least one of displaying display data on the display device 33A, emitting light from the light emitting device 33B, and outputting sound from the sound outputting device 33C.

In the present embodiment, when it is determined that the swing data does not satisfy the swinging condition, the notification control unit 419 causes the notification device 33 to output guidance data for instructing the operating condition of an operation device 35 for operating the excavator 1. Upon receiving the notification by the notification device 33, the driver can recognize that the accuracy of the stereo measurement performed based on the images PC acquired while the swinging body 3 is swinging is insufficient, that is, the failure of the stereo measurement, and can perform the stereo measurement again on the same region of the work target SB. Here, the driver can suppress the degradation of the accuracy of the stereo measurement by correcting the swinging condition of the swinging body 3 at the time of image capturing, based on the content of the notification by a notification device 44.

FIG. 13 is a diagram illustrating an example in which the display device 33A according to the present embodiment displays a guidance. The display device 33A may display the success or failure of the stereo measurement or the reason for the failure of the stereo measurement instead of the guidance or together with the guidance.

FIG. 13(A) illustrates an example of what is displayed on the display device 33A in step S180, as a result of the determination in step S50 that the swing data does not satisfy the swinging condition requiring the swinging to be terminated with no re-swinging by the swinging body 3 that has stopped swinging. As illustrated in FIG. 13(A), the display device 33A outputs text data "DO NOT PERFORM OPERATION FOR RE-SWINGING AFTER SWINGING HAS STOPPED" as the guidance, when the swinging body 3 is determined to have stopped swinging and then started swinging again.

FIG. 13(B) illustrates an example of what is displayed on the display device 33A in step S190, as a result of the determination in step S100 that the swing data of the swinging body 3 does not satisfy the swinging condition requiring the swing speed V to be lower than the predefined speed. As illustrated in FIG. 13(B), when it is determined that the swing data does not satisfy the swinging condition, that is, when it is determined that the swing speed V of the swinging body 3 is equal to or higher than the predefined speed, the display device 33A displays text data "SLOW DOWN SWING SPEED" as the guidance.

FIG. 13(C) illustrates an example of what is displayed on the display device 33A in step S190, as a result of the determination in step S100 that the swing data does not satisfy one or both of the swinging condition requiring the swing speed θ of the swinging body 3 to be larger than the first predefined angle and the swinging condition requiring the swing speed θ to be smaller than the second predefined angle. As illustrated in FIG. 13(C), when it is determined that the swing data does not satisfy the swinging condition, that is, when it is determined that the swing angle θ of the swinging body 3 is equal to or larger than the second predefined angle, the display device 33A displays text data "REDUCE SWING ANGLE" as the guidance.

Furthermore, when it is determined that the swing angle θ of the swinging body 3 is equal to or smaller than the first predefined angle, the display device 33A displays text data "SET SWING ANGLE AT START AND END OF SWINGING TO BE LARGE" as the guidance.

FIG. 13(D) illustrates an example of what is displayed on the display device 33A in step S190, as a result of the determination in step S100 that the swing data does not satisfy the swinging condition requiring the swing direction of the swinging body 3 to be a single direction with no switching from the forward direction to the reverse direction. As illustrated in FIG. 13(D), when it is determined that the swing data does not satisfy the swinging condition, that is, when it is determined that the swing direction of the swinging body 3 has been switched from the forward direction to the reverse direction, the display device 33A outputs text data "SWINGING MUST BE IN SINGLE DIRECTION DURING SWINGING SEQUENTIAL IMAGE CAPTURING" as the guidance.

FIG. 13(E) illustrates an example of what is displayed on the display device 33A in step S200, as a result of the determination in step S150 that the swing data does not satisfy the swinging condition requiring the difference between the post-swinging angle θrb of the swinging body 3 after the swinging has ended and the estimated angle θs of the swinging body 3 after the swinging has ended to be smaller than the predefined value. As illustrated in FIG. 13(E), when it is determined that the swing data does not satisfy the swinging condition, that is, when it is determined that the difference between the post-swinging angle θrb and the estimated angle θs of the swinging body 3 after the swinging has ended is equal to or larger than the predefined angle, the display device 33A displays, as the guidance, text data "CHANGE POSITION OF VEHICLE BODY. CHECK ORIENTATION OF WORKING EQUIPMENT."

When the difference between the post-swinging angle θrb and the estimated angle θs is large, the estimated angle θs is likely to be inaccurate, and the accurate estimated angle θs is likely to be difficult to acquire with the correction on the estimated angle θs. In that case, the notification control unit 419 outputs a notification signal such as the guidance as illustrated in FIG. 13(E), prompting a change in the condition for the swinging sequential image capturing.

Note that the guidance as described above, the success or failure of the stereo measurement, and the reason for the failure of the stereo measurement may be notified using the light emitting state of the light emitting device 33B including turning ON, blinking and turning OFF, or may be output as sound from the sound outputting device 33C.

Furthermore, also when stereo measurement by the three-dimensional position calculation unit 417 fails due to other reasons, the notification control unit 419 can activate the notification device 33 to notify information indicating that stereo measurement has failed.

[Effect]

As described above, according to the present embodiment, when the swinging body 3 swings under the swinging condition resulting in degradation of the measurement accuracy of stereo measurement, the driver is notified of information indicating that the swinging condition is inappropriate. Thus, the driver can adjust the operation on the operation device 35 to prevent the degradation of the measurement accuracy of the stereo measurement, and can redo the image capturing. As a result, the images PC suitable for the stereo measurement is acquired, so that the degradation of the measurement accuracy of the three-dimensional shape of the work target SB is suppressed.

In the above-described embodiment, the position of the image capturing device 30 is calculated based on the common part KS while the excavator 1 is swinging. However, this embodiment should not be construed in a limiting sense. For example, the position of the image capturing device 30 while the excavator 1 is swinging may be calculated based on detection data obtained by the position detection device 23 and detection data obtained by the orientation detection device 24.

In the above embodiment, the image capturing position calculation unit 416 calculates the image capturing position with the swing axis Zr as the constraint condition and the swing angle θ serving as the only variable. Alternatively, the position and the orientation of the image capturing device 30 may be calculated based on six variables including the position in the X axis direction, the position in the Y axis direction, the position in the Z axis direction, a roll angle, a pitch angle, and a yaw angle, without using the swing axis Zr as the constraint condition.

In the present embodiment, the image capturing device 30 starts or ends the image capturing in response to an operation on the input device 32. The image capturing device 30 may start or end the image capturing in response to an operation on the operation device 35. As described above, the operation amount sensor 36 that detects the amount of operation on the operation device 35 is provided. The operation amount sensor 36 can detect an operation state in which the operation device 35 is operated and the neutral state in which the operation device 35 is not operated. When the operation device 35 transitions to the operation state to start the swinging of the swinging body 3, the image capturing by the image capturing device 30 may be started based on the detection data obtained by the operation amount sensor 36 that has detected the operation state. When the operation device 35 transitions to the neutral state to stop the swinging of the swinging body 3, the image capturing by the image capturing device 30 may be terminated based on the detection data obtained by the operation amount sensor 36 that has detected the neutral state. Furthermore, the image capturing may be started in response to an operation on the input device 32, and may be terminated in response to the transition of the operation device 35 to the neutral state. Furthermore, whether or not the swinging body 3 is swinging may be determined by any swing detection method not based on the detection data obtained by the operation amount sensor 36.

Furthermore, the image capturing by the image capturing device 30 and the swinging of the swinging body 3 may automatically start in response to an operation on the input device 32, and then automatically end when the swinging reaches a predefined swinging stop position.

In the above-described embodiment, the input device 32 may be attached to at least one of the right control lever 35R and the left control lever 35L of the operation device 35, for example, provided to a monitor panel disposed in the cab 4, or may be provided to a portable terminal device. Furthermore, the input device 32 may be provided outside the excavator 1 and the image capturing device 30 may be remotely controlled to start or end the image capturing.

In the example of the embodiment described above, the notification control unit 419 outputs a notification signal, serving as the swinging instruction signal, to the notification device 33, when the determination unit 418 determines that the swinging condition is not satisfied. In the above embodiment, for example, when it is determined that the swing speed V is higher than the predetermined swing speed while the swinging body 3 is swinging, the swinging control unit 420 outputs a control signal, serving as the swinging instruction signal, to the hydraulic controller 38, so that the swing speed V of the swinging body 3 that is swinging is controlled to satisfy the swinging condition. In such a case, the hydraulic controller 38 may perform intervening control, for lowering the swing speed V based on the control signal from the swinging control unit 420, with respect to the drive control on the swing motor 37 corresponding to the amount of operation by the driver on the operation device 35. The control signal output to the hydraulic controller 38 to lower the swing speed V, that is, to control the swinging operation, is an example of the swinging instruction signal. The notification signal related to swinging output to the notification device 33 to control the notification device 33, example of which including stereo measurement success/failure data, stereo measurement failure reason data, and guidance data, is an example of the swinging instruction signal. Furthermore, the notification control unit 419 and the swinging control unit 420 are examples of an output unit that outputs the swinging instruction signal.

In the embodiment described above, the notification device 33 may be a monitor panel disposed in the cab 4 or may be a portable terminal device. Moreover, such a monitor panel and portable terminal device may be provided outside the excavator 1. Further, the notification device 33 may be provided outside the excavator 1 and may issue a notification to a manager outside the excavator 1. In addition, the operation device 35 and the notification device 33 may be provided outside the excavator 1, and the notification device 33 may issue a notification to a driver who is remotely operating the excavator 1.

In the above embodiment, when the swinging body 3 is swinging at the swing speed V which is considerably high but is not too high to fail to satisfy the swinging condition, the notification device 33 may notify the driver of the guidance for lowering the swing speed V in real time. In such a situation, the driver is performing the swinging operation, and thus this guidance is preferably sound for prompting the lowering of the swing speed V.

When the images PC captured by the image capturing devices 30 are stored in the image storage unit 423, a condition requiring data of the images PC stored not to exceed a predefined amount (memory over condition) or a condition requiring a period of time during which the data of the images PC is stored not to exceed a predefined period of time (time over condition) may be set as the swinging condition. Furthermore, as the swinging condition, a condition requiring the traveling body 2 to be not traveling may be set. The condition requiring the traveling body 2 to be not traveling may be set because the accuracy of the stereo measurement is degraded when the traveling body 2 travels during the swinging image capturing.

In the above embodiment, the image capturing position calculation unit 416 calculates swing data based on the common part KS, and the swing data acquisition unit 415 acquires the swing data from the image capturing position calculation unit 416. The swing data acquisition unit 415 may calculate the swing data based on detection data obtained by a detection device that calculates the swing data. For example, the swing data acquisition unit 415 may calculate swing data including the swing angle θ, the swing speed V, and the swing direction R of the swinging body 3 based on the detection data obtained by the position detection device 23 or the detection data obtained by the orientation detection device 24. Alternatively, the swing data may be calculated based on the detection data obtained by the operation amount sensor 36, or may be calculated based on detection data obtained by an angle sensor, an example of which including a rotary encoder, capable of detecting the swing data about the swinging body 3. In this case, the arithmetic processing device 41 synchronizes the timing at which the swing angle θ, which is the detection value obtained by the angle detection sensor, is acquired from the angle detection sensor, with the timing at which at least a pair of image capturing devices 30 capture images of the work target SB. In this manner, the timing at which the images PC are captured by at least a pair of image capturing devices 30 is associated with the swing angle θ of the swinging body 3 at that timing.

In the above-mentioned embodiment, the arithmetic processing device 41 executes stereo processing on the images PC captured by at least one pair of image capturing devices 30 to implement three-dimensional measurement. However, this should not be construed in a limiting sense. For example, the images PC of the excavating target SB around the excavator 1 captured by at least a pair of image capturing devices 30, as well as the position and orientation of the excavator 1 in a non-operating state obtained by the position detection device 23 and by the orientation detection device 24 are transmitted to, for example, to a management device outside the excavator 1. Then, the external management device may execute stereo processing on the images PC of the excavating target SB around the excavator 1, obtain the swing angle θ of the swinging body 3 during the swinging, and the position and the orientation of the excavator 1, and then obtain the three-dimensional position of the excavating target SB around the excavator 1 during the swinging. In this case, the management device outside the excavator 1 corresponds to the arithmetic processing device 41.

In the embodiments described above, the detection device is a stereo camera that includes at least one pair of image capturing devices 30. When the stereo camera performs image capturing, the image capturing timing is synchronized between the cameras. The image capturing device is not limited to the stereo camera. The image capturing device may be, for example, a sensor that can obtain both an image and three-dimensional data, such as a time of flight (TOF) camera. The image capturing device may be an image capturing device with which three-dimensional data can be obtained by a single camera. The image capturing device may be a laser scanner.

In the above-described embodiment, the work machine 1 is the excavator 1 including the swinging body 3. The work machine 1 may be work machine without the swinging body. For example, the work machine may be at least one of a bulldozer, a wheel loader, a dump truck, and a motor grader.

REFERENCE SIGNS LIST 1 excavator (work machine)
1B vehicle body
2 working equipment
3 swinging body
4 cab
4S driver's seat
5 traveling body
5A crawler belt
5B crawler belt
6 boom
7 arm
8 bucket
10 boom cylinder
11 arm cylinder
12 bucket cylinder
21 GPS antenna
23 position detection device
24 orientation detection device
30 image capturing device
30A, 30B, 300, 30D image capturing device
31 hub
32 input device
32A swinging sequential image capturing switch
32B single image capturing switch
33 notification device
33A display device
33B light emitting device
33C sound outputting device
34A first light emitting unit
34B second light emitting unit
35 operation device
35L left control lever
35R right control lever
36 operation amount sensor
37 swing motor
38 hydraulic controller
40 control device
41 arithmetic processing device
42 storage device
43 input/output interface
50 measurement system
300 stereo camera
301 first stereo camera
302 second stereo camera
410 image acquisition unit
411 signal acquisition unit
413 common part extraction unit
415 swing data acquisition unit
416 image capturing position calculation unit
417 three-dimensional position calculation unit
418 determination unit
419 notification control unit
420 swinging control unit
422 swinging condition storage unit
423 image storage unit
FM image capturing region
KS common part
PC image
Pr position
Pra pre-swinging position
Prb post-swinging position
Ps estimated position
RD swing direction
SB work target
Zr swing axis
θr angle
θra pre-swinging angle
θrb post-swinging angle
θs estimated angle

The invention claimed is:

1. A work machine measurement system comprising:
at least one processor configured to:
acquire an image of a work target sequentially captured, while a swinging body of a work machine is swinging, by an image capturing device mounted on the swinging body;
calculate a three-dimensional position of the work target based on the image;
acquire swing data about the swinging body;
determine whether or not the swing data about the swinging body that is swinging during the sequential capturing satisfies a predefined swinging condition; and
output a swinging instruction signal based on a result of the determination,
wherein the swinging condition includes a condition requiring the swinging body that has stopped swinging not to swing again.

2. The work machine measurement system according to claim 1, wherein
the swing data includes a swing speed of the swinging body, and
the swinging condition includes a condition requiring the swing speed to be lower than a predefined speed.

3. The work machine measurement system according to claim 1, wherein
the swing data includes a swing angle of the swinging body, and
the swinging condition includes one or both of a condition requiring the swing angle to be larger than a first predefined angle and a condition requiring the swing angle to be smaller than a second predefined angle.

4. The work machine measurement system according to claim 1, wherein
the swing data includes a swing direction of the swinging body, and
the swinging condition includes a condition requiring the swing direction to be a single direction.

5. The work machine measurement system according to claim 1, further comprising a notification device that issues a notification to a driver of the work machine, wherein
the swinging instruction signal includes a notification signal related to the swinging, and
the at least one processor outputs the notification signal to the notification device.

6. The work machine measurement system according to claim 1, further comprising a hydraulic controller that causes the swinging body to swing, wherein
the swinging instruction signal includes a control signal for controlling a swinging operation of the swinging body, and
the output unit outputs the control signal to the hydraulic controller.

7. The work machine measurement system according to claim 1, wherein
the at least one processor, when the swing data is determined not to satisfy the swinging condition, the three-dimensional position of the work target based on the image captured in an operation stop state before the swinging body starts operating and the image captured in an operation stop state after the swinging body has stopped operating.

8. A work machine comprising the work machine measurement system according to claim 1.

9. A measurement method for a work machine, the method comprising:
acquiring an image of a work target sequentially captured, while a swinging body of a work machine is swinging, by an image capturing device mounted on the swinging body;
acquiring swing data about the swinging body;
determining whether or not the swing data about the swinging body that is swinging during the sequential capturing satisfies a predefined swinging condition; and
outputting a swinging instruction signal based on a result of the determination,
wherein the swinging condition includes a condition requiring the swinging body that has stopped swinging not to swing again.

* * * * *